US012585913B2

(12) United States Patent
Son et al.

(10) Patent No.: US 12,585,913 B2
(45) Date of Patent: Mar. 24, 2026

(54) METHOD AND APPARATUS WITH NEURAL NETWORK CONVOLUTION OPERATION

(71) Applicant: SAMSUNG ELECTRONICS CO., LTD., Suwon-si (KR)

(72) Inventors: Jinwoo Son, Seoul (KR); Changyong Son, Anyang-si (KR); Jaehyoung Yoo, Seongnam-si (KR); Seohyung Lee, Seoul (KR); Sangil Jung, Yongin-si (KR); Changin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 875 days.

(21) Appl. No.: 17/071,063

(22) Filed: Oct. 15, 2020

(65) Prior Publication Data

US 2021/0192315 A1      Jun. 24, 2021

(30) Foreign Application Priority Data

Dec. 20, 2019    (KR) ........................ 10-2019-0171929

(51) Int. Cl.
*G06N 3/04* (2023.01)
*G06N 3/08* (2023.01)

(52) U.S. Cl.
CPC ................. *G06N 3/04* (2013.01); *G06N 3/08* (2013.01)

(58) Field of Classification Search
CPC .......... G06N 3/04; G06N 3/08; G06N 3/0464; G06N 3/0475; G06N 3/0495; G06N 3/0499; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS

| | | | | |
|---|---|---|---|---|
| 11,188,744 | B2 * | 11/2021 | Chen | ................ G06V 30/19173 |
| 11,487,998 | B2 * | 11/2022 | Hill | ......................... G06F 18/24 |
| 2016/0342888 | A1 | 11/2016 | Yang et al. | |
| 2016/0350645 | A1 * | 12/2016 | Brothers | ................. G06N 3/10 |
| 2016/0379073 | A1 | 12/2016 | Pan et al. | |
| 2017/0169332 | A1 | 6/2017 | Graves et al. | |

(Continued)

FOREIGN PATENT DOCUMENTS

| | | |
|---|---|---|
| CN | 108304265 A | 7/2018 |
| CN | 110046702 A | 7/2019 |

(Continued)

OTHER PUBLICATIONS

EESR dated Mar. 12, 2021 issued in counterpart European Patent Application No. 20193180.5 (8 pages in English).

(Continued)

*Primary Examiner* — Kamran Afshar
*Assistant Examiner* — Kurt Nicholas Pressly
(74) *Attorney, Agent, or Firm* — NSIP Law

(57) ABSTRACT

A processor-implemented neural network method includes: generating a first output line of an output feature map by performing a convolution operation between a first input line group of an input feature map and weight kernels; generating a first output of an operation block including the convolution operation based on the first output line; and storing the first output in a memory in which the input feature map is stored by overwriting the first output to a memory space of the memory.

29 Claims, 17 Drawing Sheets

(56) References Cited

U.S. PATENT DOCUMENTS

| | | | | |
|---|---|---|---|---|
| 2017/0221176 A1 | | 8/2017 | Munteanu et al. | |
| 2017/0323196 A1* | | 11/2017 | Gibson | G06N 3/0464 |
| 2018/0157962 A1 | | 6/2018 | Henry et al. | |
| 2018/0173571 A1* | | 6/2018 | Huang | G06N 3/063 |
| 2018/0189424 A1 | | 7/2018 | Boesch et al. | |
| 2018/0285715 A1* | | 10/2018 | Son | G06N 3/08 |
| 2019/0164037 A1* | | 5/2019 | Kim | G06N 3/04 |
| 2019/0187963 A1* | | 6/2019 | Bokhari | G06F 8/35 |

FOREIGN PATENT DOCUMENTS

| | | |
|---|---|---|
| EP | 3 480 746 A1 | 5/2019 |
| KR | 10-2018-0109619 A | 10/2018 |
| KR | 10-2019-0063393 A | 6/2019 |

OTHER PUBLICATIONS

Jin, Hai, et al. "Layer-centric memory reuse and data migration for extreme-scale deep learning on many-core architectures." *ACM Transactions on Architecture and Code Optimization* (*TACO*) 15.3 (2018): 1-26 (26 pages in English).

"Optimizing Memory Consumption in Deep Learning", MXNet, Accessed Oct. 14, 2020 (8 pages in English).

European Office Action issued on Dec. 3, 2024, in counterpart European Patent Application No. 20 193 180.5 (6 pages).

Chinese Office Action issued on Jul. 16, 2025 in corresponding Chinese Patent Application No. 202010893135.0 (13 pages in English and 7 pages in Chinese).

Korean Office Action issued on Jun. 22, 2025 in corresponding Korean Patent Application No. 10-2019-0171929 (8 pages in English).

Korean Office Action issued on Jan. 29, 2026, in counterpart Korean Patent Application No. 10-2019-0171929 (4 pages in English, 7 pages in Korean).

* cited by examiner high address

Environment variables

Stack

Heap

Working space

Uninitialized data (bss)

Initialized data (data)

Neural network model

Text

Executable instructions low address

Memory map

METHOD AND APPARATUS WITH NEURAL NETWORK CONVOLUTION OPERATION

CROSS-REFERENCE TO RELATED APPLICATIONS

This application claims the benefit under 35 USC § 119(a) of Korean Patent Application No. 10-2019-0171929 filed on Dec. 20, 2019 in the Korean Intellectual Property Office, the entire disclosure of which is incorporated herein by reference for all purposes.

BACKGROUND

1. Field

The following description relates to a method and apparatus with neural network convolution operations.

2. Description of Related Art

Technical automation of a recognition process has been implemented through a neural network model implemented, for example, by a processor as a special computing structure, which provides intuitive mapping for computation between an input pattern and an output pattern after considerable training. A trained ability to generate such mapping is the learning ability of a neural network. Furthermore, a neural network trained and specialized through special training has, for example, a generalization ability to provide a relatively accurate output with respect to an untrained input pattern.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network method includes: generating a first output line of an output feature map by performing a convolution operation between a first input line group of an input feature map and weight kernels; generating a first output of an operation block including the convolution operation based on the first output line; and storing the first output in a memory in which the input feature map is stored by overwriting the first output to a memory space of the memory.

The storing may include overwriting the first output to the memory space, and the memory space is of at least one input feature element of the input feature map that is not used in any subsequent processing of the operation block in the input feature map.

The at least one input feature element may be an input line of the first input line group that is not included in a subsequent input line group of the input feature map.

The subsequent processing of the operation block in the input feature map may include a subsequent convolution operation between the subsequent input line group and the weight kernels.

The operation block further may include any one or any combination of a pooling operation, a skip connection, and at least another convolution operation different from the convolution operation.

The method may further include: obtaining information related to the memory space of the input feature map; and allocating a memory space for the output feature map, such that the output feature map is overwritten to at least a portion of the memory space of the input feature map.

The generating of the first output line may include generating a first output element vector of the first output line by performing the convolution operation between input lines of the first input line group and a first weight kernel corresponding to a first output channel, and the first output element vector may correspond to the first output channel.

The generating of the first output line may include accumulating weighted input element vectors generated based on products between input element vectors of the first input line group and weight elements of the weight kernels.

The generating of the first output line may include multiplying a first input element vector corresponding to a first offset, among the input element vectors, with a first weight element corresponding to the first offset, among the weight elements.

The generating of the first output line may include, in response to the first weight element being a zero-weight element corresponding to "0", omitting the multiplying of the first input element vector with the first weight element.

In response to the operation block comprising a first operation corresponding to the convolution operation and a second operation that is different from the first operation and uses the first output line, the generating of the first output may include: allocating an additional buffer for the first output line, the additional buffer corresponding to the size of the first output line; performing the first operation and storing a result of the first operation as the first output line in the additional buffer; allocating an output line buffer for the first output, the output line buffer corresponding to the size of the first output; and performing the second operation using the first output line and storing a result of the second operation as the first output in the output line buffer.

The storing of the first output in the memory may include storing the first output of the output line buffer in the memory.

The input feature map may be stored in the memory in a line data structure to which data ordering is applied in an order of a width direction, a channel direction, and a height direction.

The line data structure may be different from a planar data structure to which data ordering is applied in an order of the width direction, the height direction, and the channel direction, and different from an interleaved data structure to which data ordering is applied in an order of the channel direction, the width direction, and the height direction.

The input feature map may include a plurality of input lines each including input feature vectors.

The first output line may include output feature vectors of a plurality of output channels.

A number of input lines included in the first input line group may correspond to a height of the weight kernels.

A non-transitory computer-readable storage medium may store instructions that, when executed by a processor, configure the processor to perform the method.

In another general aspect, a neural network apparatus includes: a processor configured to: generate a first output line of an output feature map by performing a convolution operation between a first input line group of an input feature map and weight kernels, generate a first output of an operation block including the convolution operation based on the first output line, and store the first output in a memory in which the input feature map is stored by overwriting the first output to a memory space of the memory.

For the storing, the processor may be configured to overwrite the first input to the memory space, and the memory space is of at least one input feature element of the input feature map that is not used in any subsequent processing of the operation block in the input feature map.

The processor may be configured to obtain information related to the memory space of the input feature map, and allocate a memory space for the output feature map, such that the output feature map is overwritten to at least a portion of the memory space.

For the generating of the first output line, the processor may be configured to accumulate multiplication results determined based on input element vectors of the first input line group and weight elements of the weight kernels.

For the generating of the first output line, the processor may be configured to generate a first output element vector of the first output line by accumulating multiplication results determined based on input element vectors of the first input line group and weight elements of a first weight kernel of the weight kernels corresponding to a first output channel, and the first output element vector may correspond to the first output channel.

In response to the operation block comprising a first operation corresponding to the convolution operation and a second operation that is different from the first operation and uses the first output line, for the generating of the first output, the processor may be configured to allocate an additional buffer for the first output line, the additional buffer corresponding to the size of the first output line, perform the first operation and store a result of the first operation as the first output line in the additional buffer, allocate an output line buffer for the first output, the output line buffer corresponding to the size of the first output, and perform the second operation using the first output line and store a result of the second operation as the first output in the output line buffer.

For the storing of the first output in the memory, the processor may be configured to store the first output of the output line buffer in the memory.

The input feature map may be stored in the memory in a line data structure to which data ordering is applied in an order of a width direction, a channel direction, and a height direction.

The input feature map may include a plurality of input lines each including input feature vectors.

The apparatus may further include a memory storing instructions that, when executed by the processor, configure the processor to perform the generating of the first output line of the output feature map, the generating of the first output of the operation block, and the storing of the first output in the memory.

In another general aspect, a processor-implemented neural network method includes: generating a first output line of an output feature map by performing a convolution operation between a first input line group of an input feature map and weight kernels; storing the first output line in a first memory space of a memory; generating a second output line of the output feature map by performing a convolution operation between a second input line group of the input feature map and weight kernels; and storing the second output line in a second memory space of the memory that may include a first input line of the first input line group by overwriting the second output line to the second memory space.

The second input line group may not include the first input line of the first input line group, and may include remaining input lines of the first input line group.

Other features and aspects will be apparent from the following detailed description, the drawings, and the claims.

Figure 1:
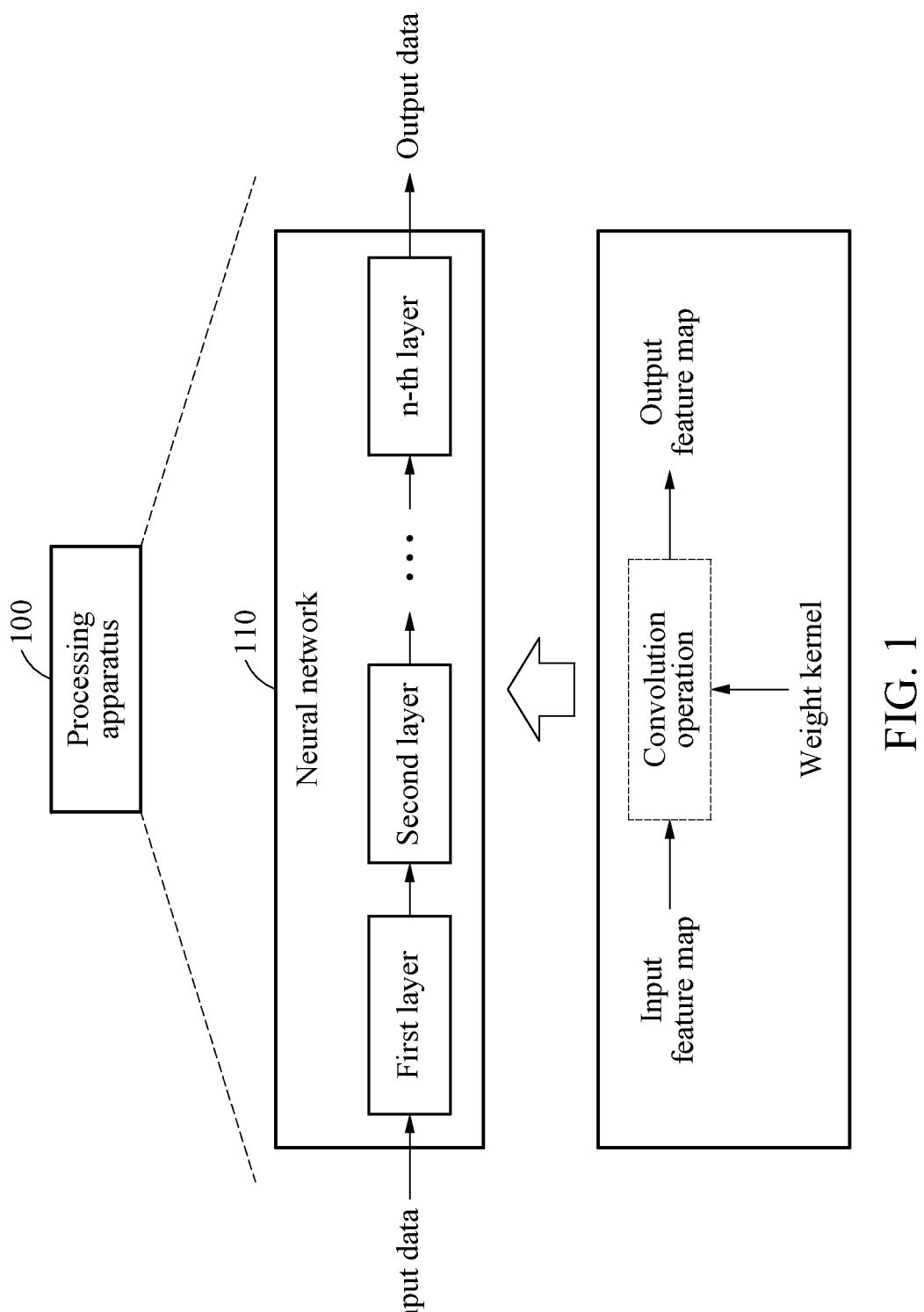
FIG. 1 illustrates an example of a processing apparatus processing a convolution operation of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

As used herein, the singular forms are intended to include the plural forms as well, unless the context clearly indicates otherwise. The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (e.g., as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. In the drawings, like reference numerals are used for like elements.

FIG. 1 illustrates an example of a processing apparatus for processing a convolution operation of a neural network. Referring to FIG. 1, a processing apparatus 100 may include a neural network 110 and may process an operation related to the neural network 110. For example, the operation related to the neural network 110 may include an object recognition operation and/or a user verification operation.

The neural network 110 may perform the object recognition operation and/or the user verification operation by mapping input data and output data which have a non-linear relationship based on deep learning. Deep learning may include a machine learning technique for solving an issue such as image or speech recognition from a large data set. Deep learning may include an optimization problem solving process of finding a point at which energy is minimized while training the neural network 110 using prepared training data. Through supervised or unsupervised deep learning, a structure of the neural network 110 and/or a weight corresponding to a model may be obtained, and the input data and the output data may be mapped to each other through the weight.

The neural network 110 may correspond to a deep neural network (DNN) including a plurality of layers. The plurality of layers may include an input layer, one or more hidden layers, and an output layer. A first layer, a second layer, and an n-th layer shown in FIG. 1 may correspond to at least a portion of the plurality of layers. For example, the first layer may correspond to the input layer, the second through an n-th-1 layer may correspond to the one or more hidden layers, and the n-th layer may correspond to the output layer. The neural network 110 may include any one or any combination of a fully connected network, a convolutional neural network (CNN), and a recurrent neural network (RNN). For example, at least a portion of the plurality of layers in the neural network 110 may correspond to the CNN, and another portion thereof may correspond to the fully connected network.

Data input into each layer in the CNN may be referred to as an input feature map, and data output from each layer may be referred to as an output feature map. The input feature map and the output feature map may also be referred to as activation data. The input feature map input into the input layer may correspond to input data.

To process the operation related to the neural network 110, the processing apparatus 100 may process various operation blocks. An operation block may include any one or any combination of at least one convolution operation (for example, a single convolution operation or a plurality of convolution operations), skip connection, and pooling operation. For example, the operation blocks may include a convolution operation related to a layer (for example, a convolutional layer) in the neural network 110. The processing apparatus 100 may perform, with respect to each convolutional layer, a convolution operation between an input feature map and weight kernels and may generate an output feature map based on a result of the convolution operation. When the width and the depth of the neural network 110 are sufficiently great, the neural network 110 may have a capacity sufficient to implement a predetermined function. The neural network 110 may achieve an optimized performance when learning a sufficiently large amount of training data through a training process.

The weight kernels may be expressed as being determined "in advance". Here, "in advance" means before the neural network 110 is "started". The neural network 110 that is "started" means the neural network 110 may be prepared for inference. For example, the neural network 110 that is "started" may include the neural network 110 having been loaded to a memory, or the neural network 110 having received input data for inference after being loaded to the memory. For example, the weight kernels may be trained and subsequently used for an inference operation.

In a sliding window-type convolution operation, a region in the input feature map scanned by the weight kernel (e.g., a region of features values of the input feature map multiplied with weights of the weight kernel) in a stride may not be scanned again in the convolution operation. One or more embodiments of the present disclosure may increase the utilization of a memory space by utilizing the characteristic of the sliding window-type convolution operation, non-limiting examples of which will be described further below. For example, to store the output feature map, a memory space of the input feature map that would not be used again in the future may be reused. Through this, a limited memory space may be used efficiently, and an overflow expected in the memory space may be prevented, thereby improving the functioning of computers on which the one or more embodiments may be implemented.

Figure 2:
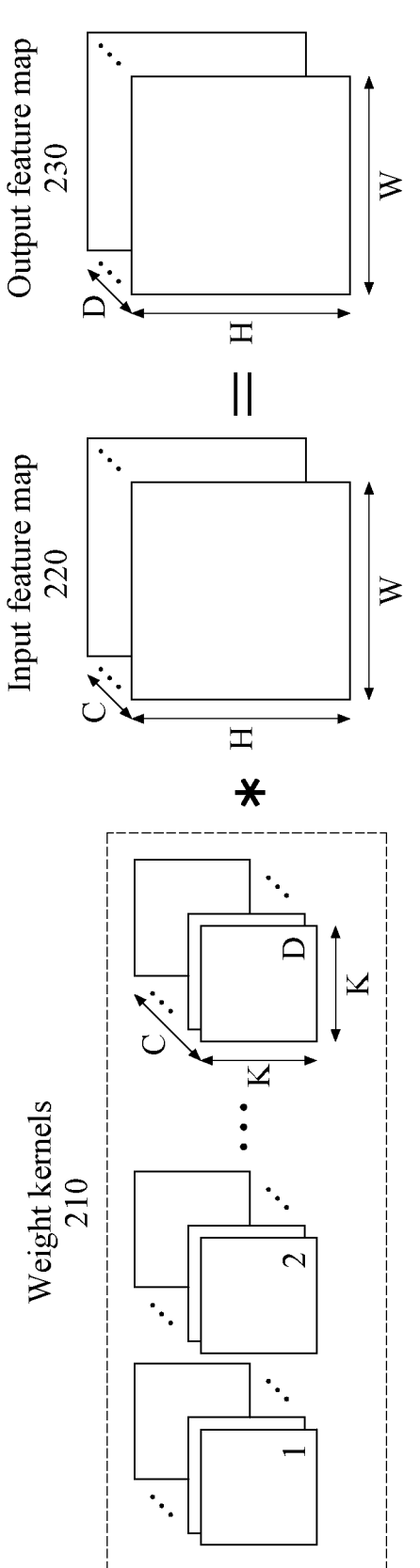
FIG. 2 illustrates an example of data related to a convolution operation.

FIG. 2 illustrates an example of data related to a convolution operation. Referring to FIG. 2, an output feature map 230 may be generated based on a convolution operation between weight kernels 210 and an input feature map 220. The weight kernels 210, the input feature map 220, and the output feature map 230 may each be expressed as one or more planes (e.g., two-dimensional matrices). For example, a weight kernel 1 to a weight kernel D may each include C weight planes, the input feature map 220 may include C input planes, and the output feature map 230 may include D output planes. The C weight planes and the C input planes may respectively correspond to input channels, and the D output planes respectively correspond to output channels.

Further, C may correspond to the number of input channels, and D may correspond to the number of output channels.

Each plane may include elements of a predetermined bit width. For example, each weight plane may have a size of K×K, and each input plane and each output plane may have a size of W×H. Here, W, K, and H may each denote a number of elements. Elements of a weight plane may be referred to as weight elements, elements of an input plane may be referred to as input elements, and elements of an output plane may be referred to as output elements. The convolution operation may be performed elementwise.

For ease of description, the width and the height of a weight plane may be equally K and that the size of an input plane and the size of an output plane may be equally W×H. However, in some examples, the width and the height of a weight plane may be different from each other, and/or the size of an input plane and the size of an output plane may be different from each other.

Figure 3:
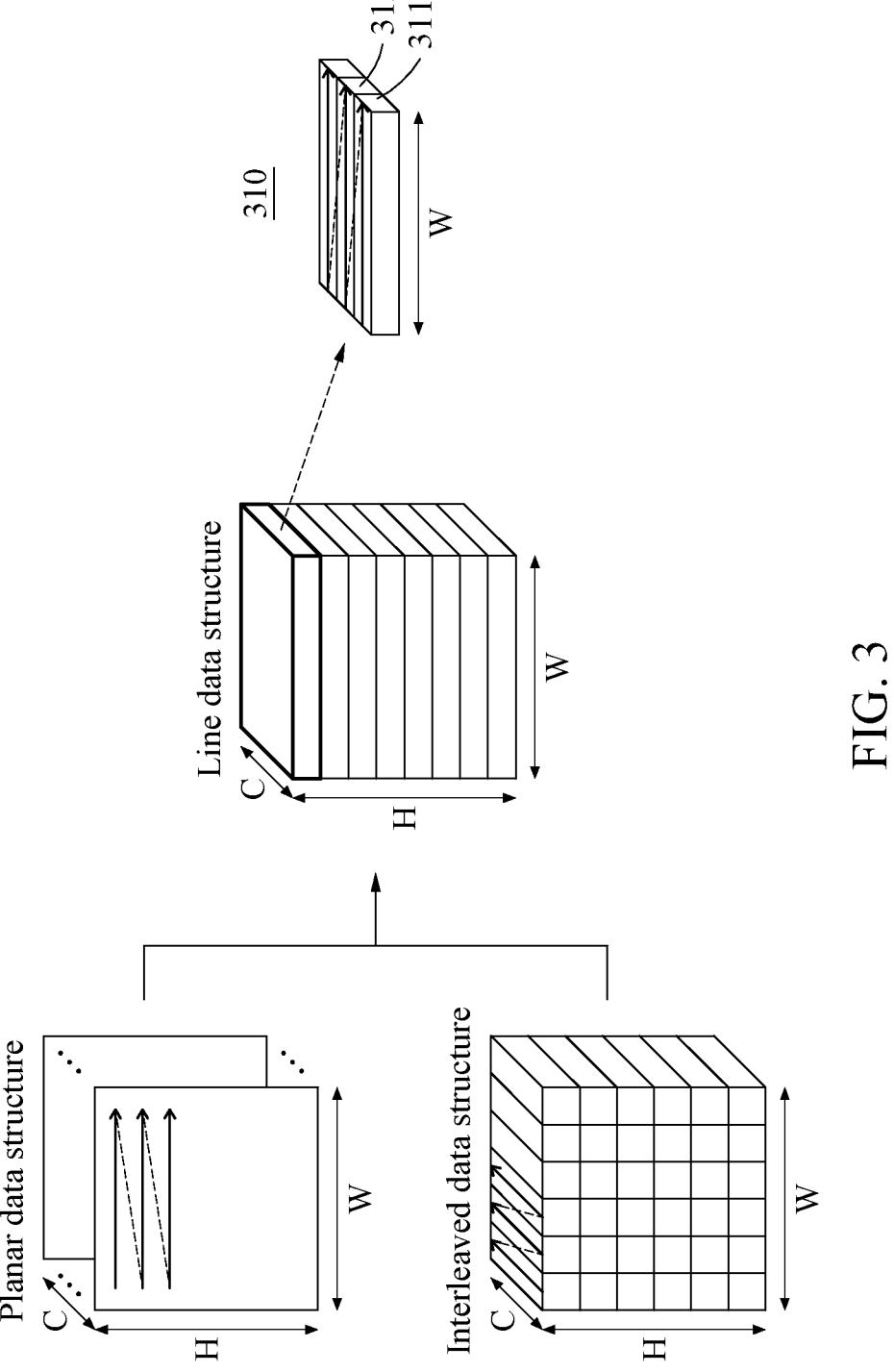
FIG. 3 illustrates an example of a line data structure.

FIG. 3 illustrates an example of a line data structure. In FIG. 3, an interleaved data structure and a line data structure are expressed in the form of a three-dimensional (3D) block, rather than a plane. Such a difference in the expression form is only for ease of description, as the form of a plane and the form of a 3D block may be substituted for each other. and a planar data structure, the interleaved data structure, and the line data structure of FIG. 3 may each include the same number of input elements (for example, W×H×C input elements).

The planar data structure, the interleaved data structure, and the line data structure of FIG. 3 may each correspond to a data ordering scheme for storing input elements in a memory. Data ordering may include determining an order to allocate a memory address to data when storing the data in a memory.

Referring to FIG. 3, in the case of the planar data structure, data ordering may be applied thereto in an order of a width direction, a height direction, and a channel direction. In the case of the interleaved data structure, data ordering may be applied thereto in an order of the channel direction, the width direction, and the height direction. The planar data structure may exhibit a high operation efficiency when the respective input planes are used as a whole, but may exhibit a low operation efficiency for processing outputs in relatively small units. The interleaved data structure may be advantageous for processing outputs in relatively small units, but may be disadvantageous for efficiently utilizing the sparsity of data (in an example, utilizing the sparsity of data may include zero skipping).

A line data structure that fuses the advantages of the planar data structure and the interleaved data structure may be utilized. In the case of the line data structure, data ordering may be applied thereto in an order of the width direction, the channel direction, and the height direction. The line data structure may include a plurality of input lines. For example, an input line 310 may include a plurality of input feature vectors each including a plurality of input elements. Here, each input feature vector may correspond to a predetermined input channel. For example, an input feature vector 311 corresponds to a first input channel, and an input feature vector 312 corresponds to a second input channel. The input line 310 may span the entirety of the width direction and the height direction, and the input feature vectors 311 and 312 may each span the entirety of the width direction.

In the case of the line data structure, an output may be generated for each line which is a relatively small unit (compared to, for example, a unit of an input plane processed using the planar data structure). Further, accelerated processing is possible using the sparsity during a process of multiplying an input element vector of each input line by a corresponding weight element, non-limiting examples of which will be described below.

Figure 4:
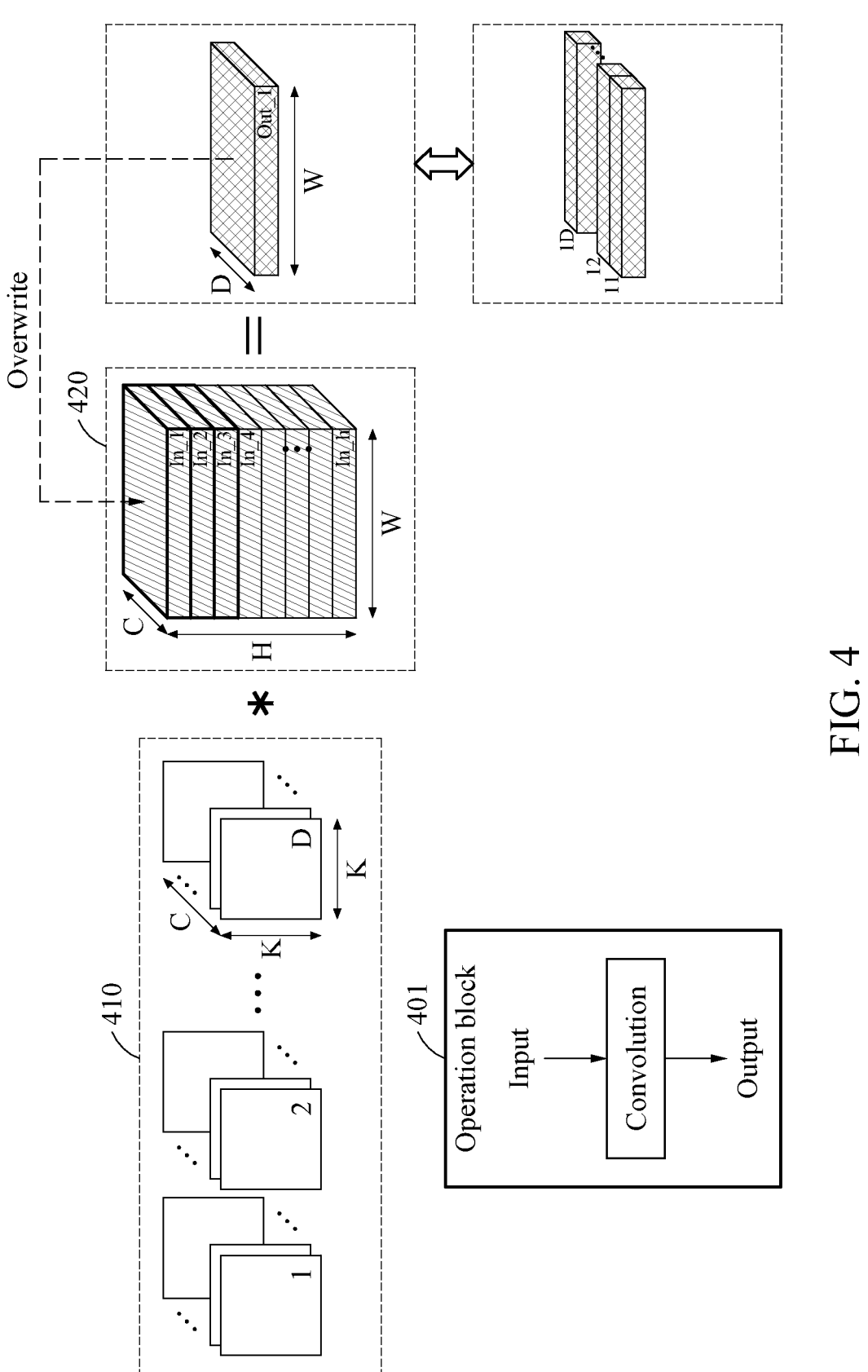
FIG. 4 illustrates an example of a convolution operation and a process of storing an output line.

FIG. 4 illustrates an example of a convolution operation and a process of storing an output line. Referring to FIG. 4, an operation block 401 including a convolution operation is processed. The operation block 401 may receive weight kernels 410 and an input feature map 420 as an input, and may output an output feature map. For ease of description, FIG. 4 illustrates an output line Out_1 corresponding to a portion of the output feature map, rather than illustrating the entire output feature map (for example, Out_1 to Out_h). According to a line data structure, the input feature map 420 may include input lines In_1 to In_h, and the output feature map may include output lines including the output line Out_1. The input lines In_1 to In_h may each include input feature vectors, and the output lines may each include output feature vectors. Each input feature vector of an input line may correspond to a different input channel, and each output feature vector of an output line may correspond to a different output channel. In an example, each of the number of input lines and the number of output lines may be "h".

To process the operation block 401, a computing device may perform a convolution operation between the weight kernels 410 and the input feature map 420. The computing device may generate the output lines by performing the convolution operation while sequentially processing the input lines In_1 to In_h for each convolution unit corresponding to the height K of the weight kernels 410. The input lines In_1 to In_h corresponding to the convolution unit is referred to as an input line group. In an example, a number of input lines included in the input line group may correspond to the height K of the weight kernels 410. For example, when the height K of the weight kernels 410 is "3", the processing apparatus may determine a first input line group to include three input lines In_1 to In_3.

The computing device may generate the output line Out_1 by performing a convolution operation between the first input line group and the weight kernels 410. For example, the computing device may generate an output element vector 11 of the output line Out_1 by performing a convolution operation between the first input line group and a weight kernel 1, may generate an output element vector 12 of the output line Out_1 by performing a convolution operation between the first input line group and a weight kernel 2, and may generate an output element vector 1D of the output line Out_1 by performing a convolution operation between the first input line group and a weight kernel D. The weight kernel 1 and the output element vector 11 may correspond to a same output channel, the weight kernel 2 and the output element vector 12 may correspond to a same output channel, and the weight kernel D and the output element vector 1D may correspond to a same output channel. The output element vectors 11 to 1D may constitute the output line Out_1. The convolution operation may be performed cumulatively. Non-limiting examples of the cumulative convolution operation will be described further below.

The computing device may generate the output of the operation block 401 based on the output line Out_1. For example, when the operation block 401 includes another operation in addition to the convolution operation, the output of the operation block 401 may be generated by additionally performing the other operation based on the output line Out_1. In an example of FIG. 4 where the operation block 401 includes the convolution operation but not the other operation, the output line Out_1 may correspond to the output of the operation block 401.

The computing device may store the output line Out_1 generated when performing the convolution operation between the first input line group and the weight kernels 410 in an output line buffer corresponding to the size of the output line Out_1. Then, the computing device may store the output line Out_1 in a memory by overwriting the output line Out_1 stored in the output line buffer to a memory space of the memory in which at least one input feature element of the input feature map 420 is stored, wherein the at least one input feature element is not used any further for processing the operation block 401. For example, when the input line In_1 is not used any further for processing the operation block 401 once the output line Out_1 is generated, the computing device may overwrite the output line Out_1 to a memory space in which the input line In_1 is stored.

When the operation related to the first input line group is completed (for example, when the output line Out_1 is generated), the processing apparatus may determine a second input line group to include input lines In_2 to In_4, and may perform a convolution operation between the second input line group and the weight kernels 410 to generate an output line Out_2 of the output feature map. As described above, the computing device may generate the output feature map by sequentially performing the convolution operation related to each input line group. During the process of generating the output feature map, each output line is overwritten to at least a portion of the memory space of the input feature map 420 through the output line buffer. For example, when the input line In_2 is not used any further for processing the operation block 401 once the output line Out_2 is generated, the computing device may overwrite the output line Out_2 to a memory space in which the input line In_2 is stored.

Figure 5:
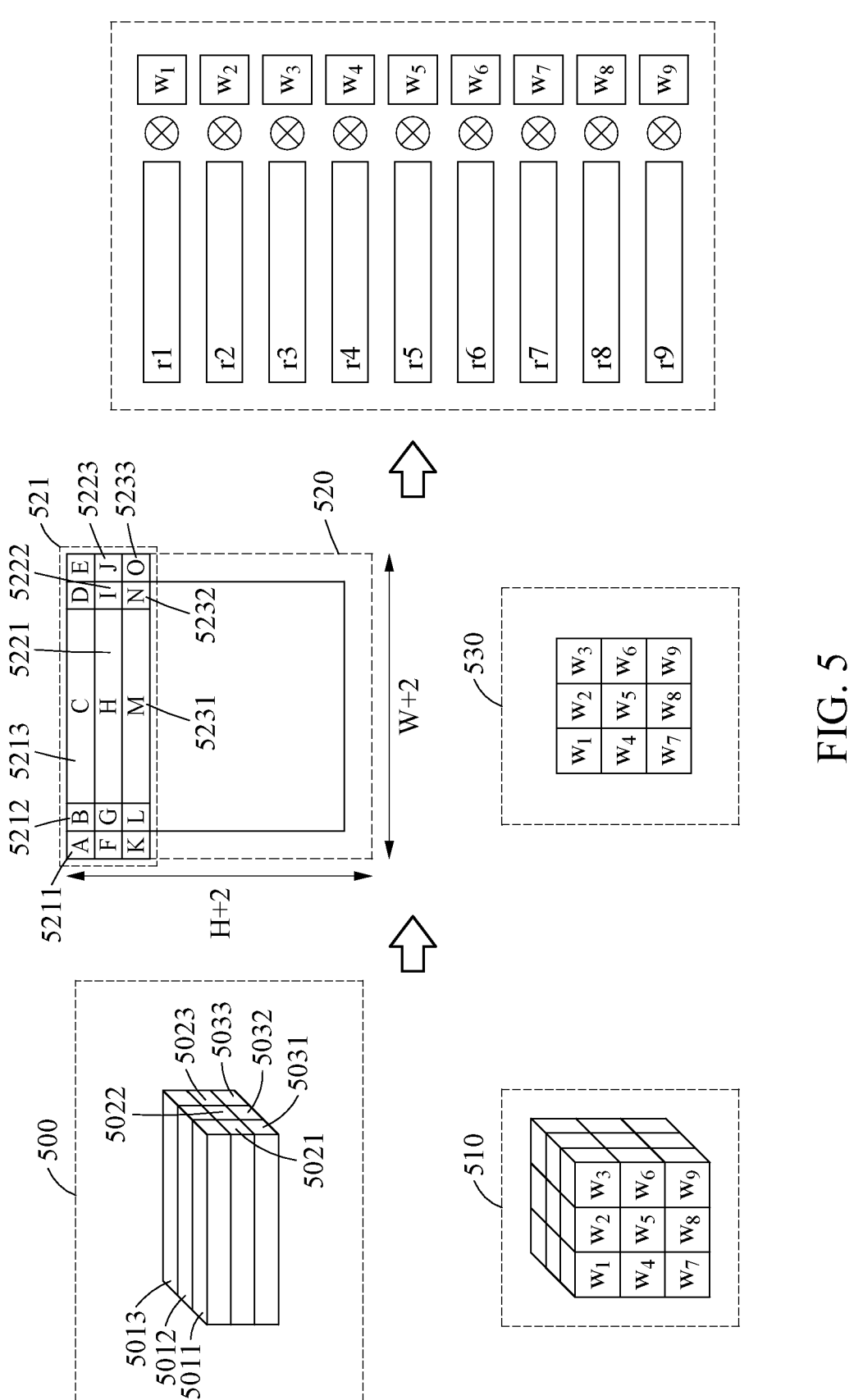
FIGS. 5 and 6 illustrate examples of generating output element vectors.
Figure 6:
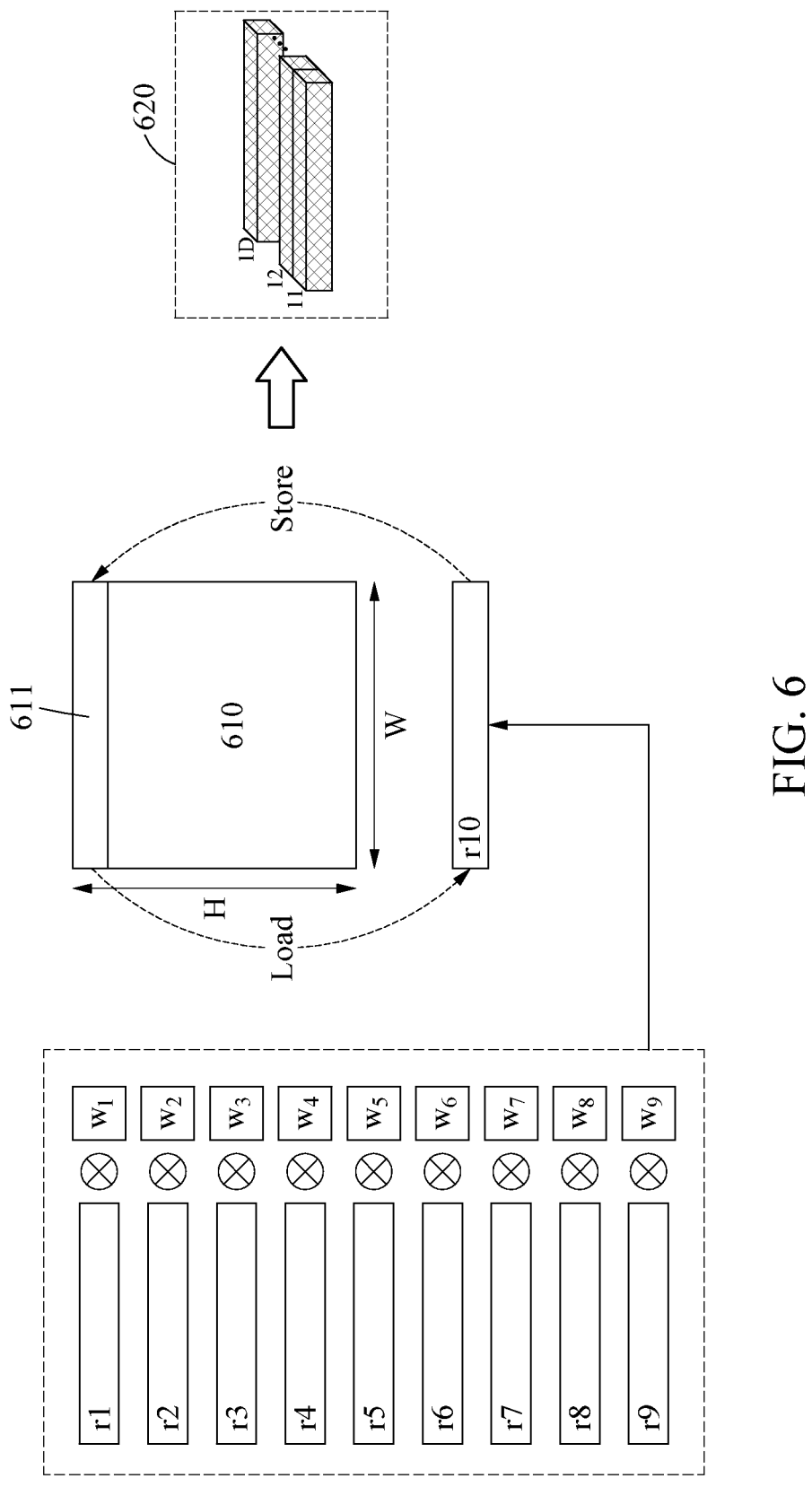

FIGS. 5 and 6 illustrate examples of generating output element vectors. A convolution operation may be performed in a manner of accumulating intermediate results of the convolution operation to an output feature map. Accordingly, the convolution operation does not require a buffering operation of converting a weight kernel or an input feature map into a form appropriate for convolution and storing the same in a buffer. Further, single-instruction multiple-data (SIMD) may be processed using a line data structure. SIMD may refer to a type of operation processing of a processor that processes multiple data using a single instruction. Thus, the speed for the convolution operation may improve greatly.

Referring to FIG. 5, an input line group 500 and a weight kernel 510 are illustrated. The input line group 500 may correspond to one of input line groups of an input feature map defined during a convolution operation process. For example, the input line group 500 may correspond to the first input line group of FIG. 4. The weight kernel 510 may correspond to one of weight kernels used during the convolution operation. For example, the weight kernel 510 may correspond to the weight kernel 1 of FIG. 4. As described above, an output element vector (for example, the output element vector 11 of FIG. 4) may be generated according to a convolution operation between the input line group 500 and the weight kernel 510.

Hereinafter, a cumulative convolution operation will be described in terms of input element vectors 5011, 5021, and 5031. The following description may also apply to an operation related to the remaining input element vectors 5012, 5013, 5022, 5023, 5032, and 5033. Further, the following description does not limit an order of applying the input element vectors 5011 to 5033 during the cumulative convolution operation. That is, during the cumulative convolution operation, the input element vectors 5011 to 5033 may be applied in various orders. For example, based on the line data structure, the input element vectors 5011, 5012, and 5013, the input element vectors 5021, 5022, and 5023, and the input element vectors 5031, 5032, and 5033 may be sequentially applied to the convolution operation.

Referring to FIG. 5, an input plane 520 is illustrated. A sliding region 521 of the input plane 520 corresponds to the input element vectors 5011, 5012, and 5013. In an example of FIG. 5, a sliding stride may be "1" and zero padding through two lines of element vectors may be applied to each of a horizontal direction and a vertical direction of the input plane 520. Thus, the width of the input plane 520 may be "W+2", and the height thereof may be "H+2".

A convolution between the input plane 520 and a weight plane 530 may be performed. The input plane 520 and the weight plane 530 may correspond to the same input channel. When the weight plane 530 slides on the input plane 520, response regions to which weight elements of the weight plane 530 respond may be determined in the sliding region 521. In more detail, a weight element $w_1$ may respond to a response region 5211, a weight element $w_2$ may respond to a response region 5212, and a weight element $w_3$ may respond to a response region 5213. Remaining weight elements $w_4$ to $w_9$ may respectively respond to the remaining response regions 5221 to 5233. In an example, the response region 5211 includes regions A, B, and C; the response region 5212 includes regions B, C, and D; the response region 5213 includes regions C, D, and E; the response region 5221 includes regions F, G, and H; the response region 5222 includes regions G, H, and I; the response region 5223 includes regions H, I, and J; the response region 5231 includes regions K, L, and M; the response region 5232 includes regions L, M, and N; the response region 5233 includes regions M, N, and O.

Input element vectors may be extracted from the response regions 5211 to 5233 and stored in registers r1 to r9. For example, a first input element vector of the response region 5211 may be stored in the register r1, and a second input element vector of the response region 5212 is stored in the register r2. Thus, in an example, the input elements vectors of the response regions 5211 to 5233 may respectively be stored in the registers r1 to r9. As described above, the input element vectors may be sequentially stored in the registers r1 to r9.

The input element vectors may each be multiplied elementwise by a corresponding weight element, among the weight elements $w_{to}$ $w_9$, whereby weighted input element vectors may be generated. A corresponding pair may be determined based on an offset of each of the input element vectors and an offset of each of the weight elements $w_1$ to $w_9$. For example, an input element vector corresponding to a first offset among the input element vectors may be multiplied by a first weight element corresponding to the first offset among the weight elements $w_1$ to $w_9$. The first input element vector of the response region 5211 may be stored in the register r1 and multiplied by the weight element $w_1$, whereby a first weighted input element vector is generated. The second input element vector of the response region 5212 may be stored in the register r2 and multiplied by the weight element $w_2$, whereby a second weighted input element vector is generated. The response regions 5211 to 5233, the input element vectors, and the size of the weighted input element vectors may correspond to an SIMD operation unit.

According to the cumulative convolution operation, each input element vector may be multiplied by a corresponding weight element. When there is a zero-weight element corresponding to "0", an operation related to the zero-weight element may be omitted from the process. For example, when the weight element $w_1$ is a zero-weight element corresponding to "0", a multiplication between the first input element vector and the weight element $w_1$ is omitted. Thus, according to the cumulative convolution operation, zero skipping may be efficiently processed.

A cumulative vector corresponding to the sliding region 521 may be generated by accumulating (for example, summing) the weighted input element vectors generated through the process described above. Further, when the process is iteratively performed with respect to sliding regions, cumulative vectors corresponding to the respective sliding regions may be generated, and the cumulative vectors may be accumulated to form an output element vector. Referring to FIG. 6, a previously stored cumulative vector (hereinafter, referred to as the first cumulative vector) may be loaded from a cumulative region 611 of an output plane 610 and stored in a register r10. When a new or subsequent cumulative vector (hereinafter, referred to as the second cumulative vector) is generated through the registers r1 to r9 (for example, by accumulating the weighted input element vectors generated based on the registers r1 to r9 and the weight elements $w_1$ to $w_9$), the first cumulative vector and the second cumulative vector may be accumulated in the register r10 and stored in the cumulative region 611.

In an example of FIG. 6, a process of storing a cumulative vector in the cumulative region 611 may be performed at least once. For example, FIG. 6 may correspond to a situation in which a first cumulative vector is generated through a convolution operation between a first input plane (for example, input plane 520 corresponding to input element vectors 5011, 5012, and 5013) and a first weight plane (for example, weight plane 530) each corresponding to a first input channel and stored in the cumulative region 611, a second cumulative vector is generated through a convolution operation between a second input plane (for example, an input plane corresponding to input element vectors 5021, 5022, and 5023) and a second weight plane (for example, a second weight plane of the weight kernel 510) each corresponding to a second input channel, and the first cumulative vector and the second cumulative vector are accumulated and stored in the cumulative region 611. When an initial value is stored in the cumulative region 611 (that is, when a cumulative vector is first generated), a process of loading a cumulative vector from the cumulative region 611 is omitted, and a newly generated cumulative vector is stored in the cumulative region 611 without performing a separate accumulation operation (for example, at least because the second cumulative vector is yet to be generated).

When cumulative vectors are iteratively stored in the cumulative region 611 a number of times corresponding to the number of input channels, the output element vector 11 corresponding to the cumulative region 611 may be determined. For example, the operation process related to the input element vectors 5011, 5021, and 5031 of FIG. 5 described above may be iteratively performed with respect to the remaining input elements 5012, 5013, 5022, 5023, 5032, and 5033 of FIG. 5. Further, this operation may be iteratively performed with respect to weight kernels corresponding to different output channels, whereby the output element vectors 12 and 1D are generated, and thus an output line 620 (for example, output line Out_1) may be generated. As described above, during the process of generating the output line 620, the output line 620 may be temporarily stored in an output line buffer, and when the generation of the output line 620 is completed, the output line 620 may be stored in a memory space in which an input output map is stored, to be overwritten to a portion of the input output map.

Figure 7:
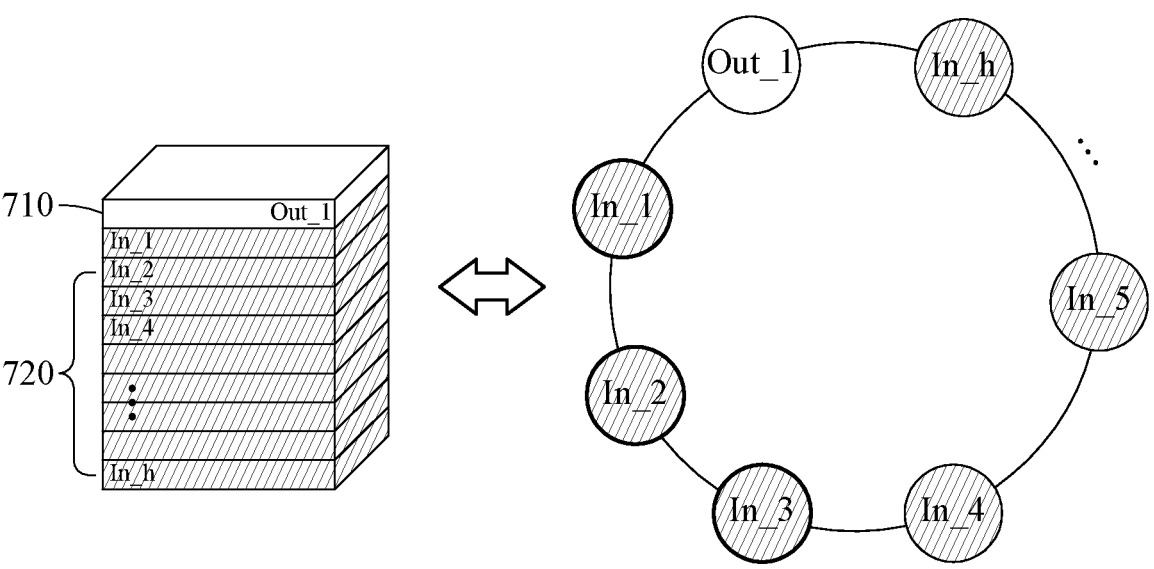
FIGS. 7 through 9 illustrate examples of storage states of input lines and output lines in a memory.
Figure 8:
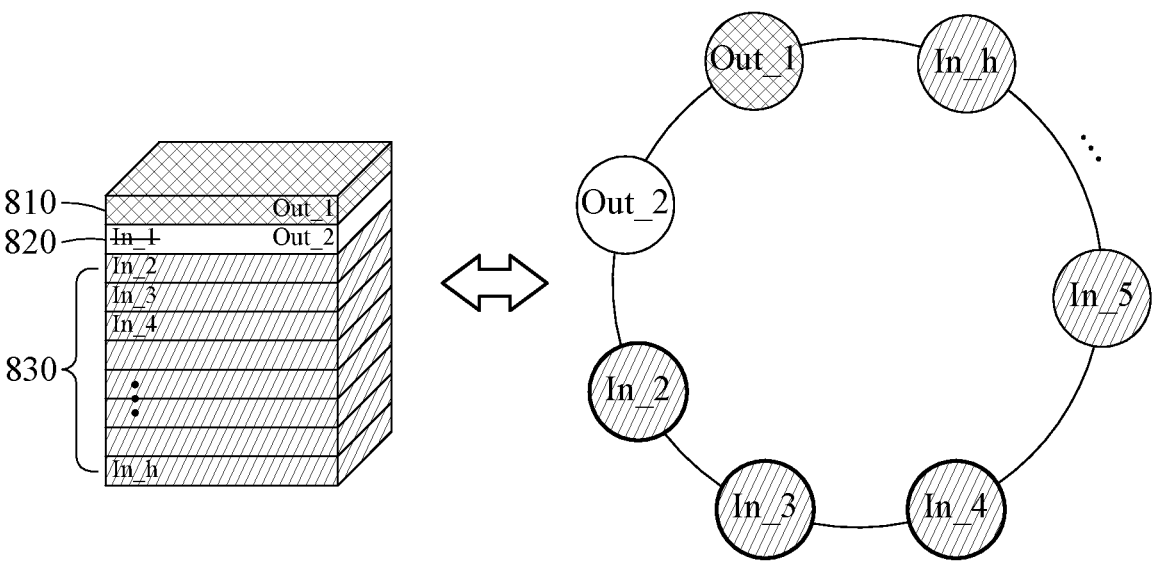
Figure 9:
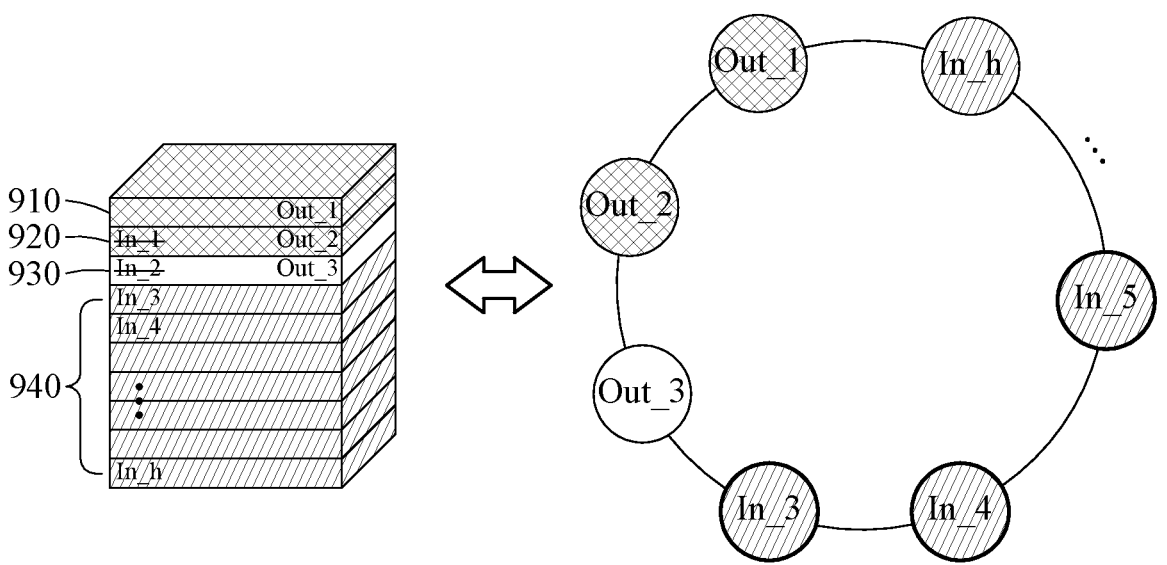

FIGS. 7 through 9 illustrate examples of storage states of input lines and output lines in a memory. In examples of FIGS. 7 through 9, an operation block may include a single convolution operation. Thus, when an output line is generated, the output line may be immediately stored in a memory space. When the operation block includes an operation other than the single convolution operation, an additional operation related to the output line may be performed, and a corresponding result may be stored in a memory space. The memory space may specifically correspond to a working space of the memory space. Although an output line Out_1 may be stored in a memory space 710 in the example of FIG. 7, an additional operation result related to the output line Out_1 may be stored in the memory space 710 when the operation block includes another operation, non-limiting examples of which will be described further below.

Referring to FIG. 7, an input feature map including input lines In_1 to In_h may be stored in a memory space 720. The memory space 710 may be reserved for the output line Out_1. The memory space 710 may be a separate space different from the memory space 720. Data of the input line In_1 may be used (for example, to generate output line Out_1 using the convolution operation) until the output line Out_1 is generated through a cumulative convolution operation of the convolution operation. Thus, the memory space 710 different from the memory space 720 may be separately allocated to retain the data of the input line In_1 until the output line Out_1 is generated. A convolution operation related to a first input line group including input lines In_1 to In_3 may be performed, whereby the output line Out_1 is generated. When the output line Out_1 is generated, the output line Out_1 may be stored in the memory space 710.

Referring to FIG. 8, an output line Out_1 may be stored in a memory space 810, and an input feature map including input lines In_2 to In_h may be stored in a memory space 830. A memory space 820 may be reserved for an output line Out_2. A convolution operation related to a second input line group including the input lines In_2 to In_4 may be performed, whereby an output line Out_2 may be generated. When the output line Out_2 is generated, the output line Out_2 may be stored in the memory space 820. During the process of generating the output line Out_2, an input line In_1 previously stored in the memory space 820 may be substituted (for example, overwritten) for the output line Out_2. That is because after the output line Out_1 is generated, the input line In_1 may not be used any further for processing the operation block. Accordingly, the memory space 820 may be reused.

Referring to FIG. 9, an output line Out_1 may be stored in a memory space 910, an output line Out_2 may be stored in a memory space 920, and an input feature map including input lines In_3 to In_h may be stored in a memory space 940. A memory space 930 may be reserved for an output line Out_3. A convolution operation related to a third input line group including input lines In_3 to In_5 may be performed, whereby an output line Out_3 may be generated. When the output line Out_3 is generated, the output line Out_3 may be stored in the memory space 930. During the process of generating the output line Out_3, an input line In_2 previously stored in the memory space 930 may be substituted for the output line Out_3. That is because if the output line Out_2 is generated, the input line In_2 may not be used any further for processing the operation block. Accordingly, the memory space 930 may be reused.

The above process may be iteratively performed until all output lines are generated, whereby an output feature map is generated. Accordingly, during this process, the output lines of the output feature map may be overwritten to a memory space of an input feature map that is not used any further for the convolution operation, whereby the efficiency of use of the memory space may increase, thereby improving the functioning of computers on which the process may be implemented.

Figure 10:
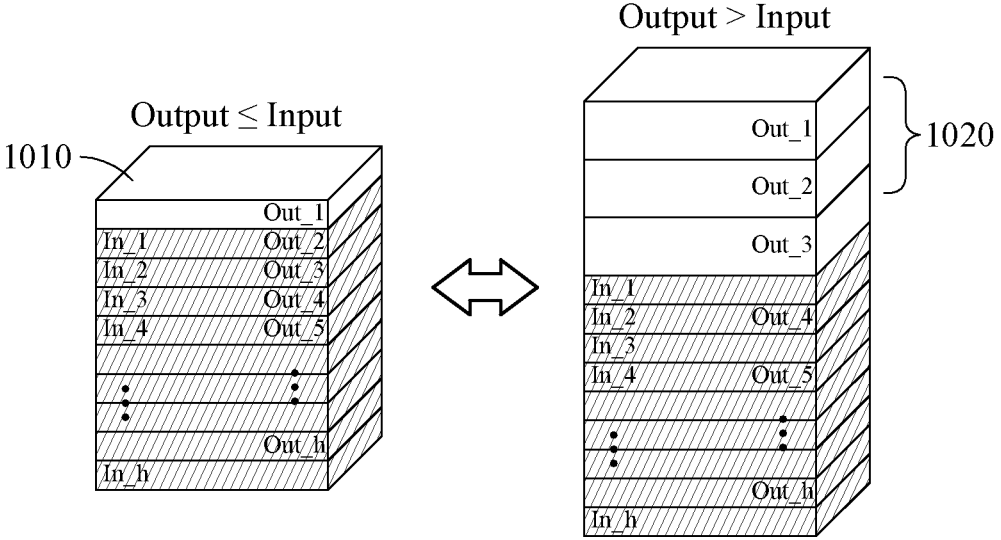
FIG. 10 illustrates an example of additionally allocating a memory space in view of a relationship between the size of an output feature map and the size of an input feature map.

FIG. 10 illustrates an example of additionally allocating a memory space in view of a relationship between the size of an output feature map and the size of an input feature map. A case where the size of an output feature map is equal to or less than the size of an input feature map (Hereinafter, referred to as Case 1) is shown on the left side of FIG. 10, and a case where the size of an output feature map is greater than the size of an input feature map (hereinafter, referred to as Case 2) is shown on the right side of FIG. 10. The examples of FIGS. 7 through 9 may correspond to a case where the size of an output feature map is equal to the size of an input feature map.

As described above, in Case 1, data of an input line In_1 may be used in operations of the operation block until an output line Out_1 is generated through a cumulative convolution operation. Thus, a memory space 1010 is additionally allocated to retain the data of the input line In_1 until the output line Out_1 is completed. However, Case 2 may include an additional memory space 1020 which is greater than the memory space 1010.

In Case 1, the size of the memory space used for additional allocation may be equal to the size of an output line buffer. The size of the output line buffer may correspond to a value obtained by dividing the size of the output feature map by h. Here, h may denote the number of input lines and/or the number of output lines. The size of the memory space used for additional allocation in Case 1 may be expressed by Equation 1 below, for example.

$$memory_a = map_{out} - map_{in} + \frac{map_{out}}{h} \qquad \text{Equation 1}$$

In Equation 1, $memory_a$ denotes the size of the memory space used for additional allocation, $map_{out}$ denotes the size of the output feature map, $map_{in}$ denotes the size of the input feature map, and h denotes the number of input lines and the number of output lines.

In Case 2, the size of the memory space requiring additional allocation may be equal to a value obtained by adding the size of the output line buffer to the difference between the size of the input feature map and the size of the output feature map. The size of the memory space used for additional allocation in Case 2 may be expressed by Equation 2 below, for example.

$$memory_a = map_{out}/h \qquad \text{Equation 2:}$$

In Equation 2, $memory_a$ denotes the size of the memory space requiring additional allocation, $map_{out}$ denotes the size of the output feature map, and h denotes the number of input lines and the number of output lines.

The processing apparatus may perform memory setting and memory allocation based on memory information of the input feature map and memory information of the output feature map. For example, the processing apparatus may compare the size of the input feature map and the size of the output feature map and determine the size of an additional memory based on one of Equation 1 and Equation 2.

The processing apparatus may determine a memory address of the output feature map based on the size of the additional memory and the memory information of the output feature map. In an example, the memory address of the output feature map may be determined such that at least a portion of the output feature map is overwritten to at least a portion of the input feature map. Then, the processing apparatus may determine a memory index of each output line. For example, the processing apparatus may perform memory indexing for each output line in view of the memory address of the output feature map and the number of output lines.

As described above, the operation block may include at least one operation other than (for example, in addition to) a convolution operation. For example, the operation block may include a convolution operation (hereinafter, referred to as the first operation) and another operation (hereinafter, referred to as the second operation). The second operation may include another convolution operation, a skip connection, and/or a pooling operation. In this example, the processing apparatus may allocate an additional buffer to additionally perform the second operation with respect to a result of the first operation.

For example, the result of performing the first operation may be the generation of a first output line, and a result of performing the second operation may be the generation of a first output. In an example, the processing apparatus may operate as follows. The processing apparatus may allocate an additional buffer for the first output line. The additional buffer may correspond to the size of the first output line. The processing apparatus may perform the first operation and stores the result of the first operation as the first output line in the additional buffer.

The processing apparatus may allocate an output line buffer for the first output. The output line buffer may correspond to the size of the first output. The processing apparatus may perform the allocation of the additional buffer and the allocation of the output line buffer sequentially or concurrently. The processing apparatus may perform the second operation using the first output line and store the result of the second operation as the first output in the output line buffer. When the first output is completed, the processing apparatus may store the first output of the output line buffer in the memory. In an example, a portion of the input feature map may be substituted for the first output.

Through the above process, a memory space required for performing a plurality of operations may be minimized. Hereinafter, examples of an operation block including a plurality of operations will be described with reference to FIGS. 11 and 12.

Figure 11:
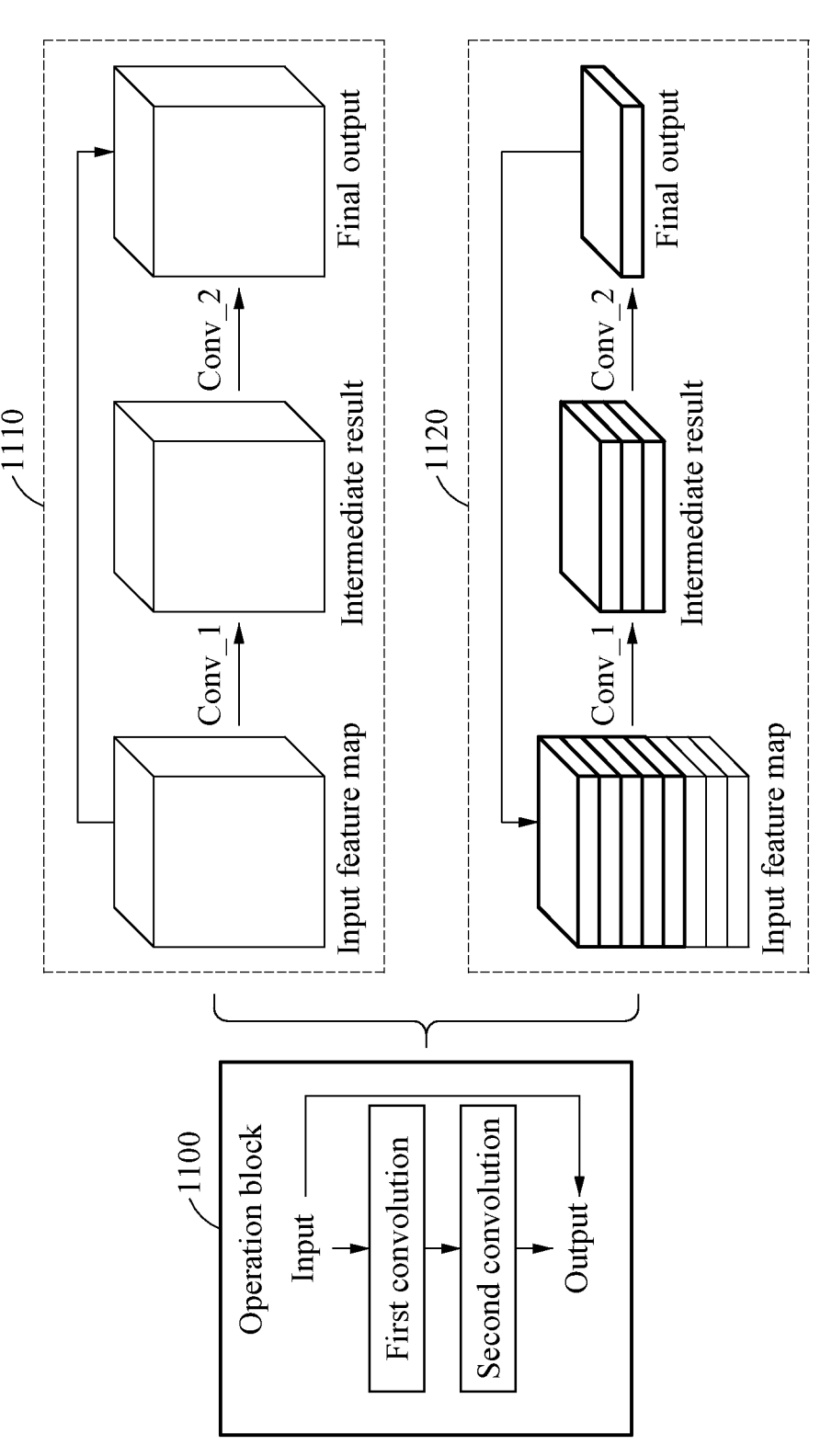
FIG. 11 illustrates an example of an operation process related to an operation block including a skip connection.

FIG. 11 illustrates an example of an operation process related to an operation block including a skip connection. Referring to FIG. 11, an operation block 1100 may include a first convolution operation, a second convolution operation, and a skip connection between an input and an output. For example, the operation block 1100 may be used for a residual CNN.

According to a general operation process 1110, a first convolution operation may be performed with respect to an input feature map, and an intermediate result may be generated. The intermediate result may correspond to an output feature map according to the first convolution operation. Then, a second convolution operation may be performed with respect to the intermediate result, and a skip connection related to the input feature map may be applied (for example, to a result of the second convolution operation), whereby a final output is generated. Thus, according to the general operation process 1110, a memory space for the input feature map, a memory space for the intermediate result, and a memory space for the final output may be used.

According to an operation process 1120, a first convolution operation may be performed with respect to an input feature map, and an intermediate result may be generated. In an example, a portion of input lines of the input feature map (for example, the portion to be used for generating a final output) my be used to generate the intermediate result. For example, the final output may correspond to a single line, and the intermediate result may correspond to three lines. In an example, five input lines are selectively used to generate a single output line. The three lines corresponding to the intermediate result may be stored in an additional buffer. Thus, the final output may be generated without using a memory space for storing the intermediate result overall as in the general operation process 1100.

Then, a second convolution operation may be performed with respect to the intermediate result, and a skip connection related to the input feature map may be applied (for example, to a result of the second convolution operation), whereby the final output is generated. The final output may be stored in a single output line buffer, and then stored in a memory space for the input feature map. Thus, the final output may be generated without using a memory space for storing the final output overall as in the general operation process 1110. Consequently, according to the operation process 1120, the memory space for the input feature map, the additional buffer (for example, of the size corresponding to three lines) for the intermediate result, and the output line buffer (for example, of the size corresponding to a single line) for the final output may be used. Thus, the memory space efficiency may increase, thereby improving the functioning of computers on which the operation process 1120 may be implemented.

Figure 12:
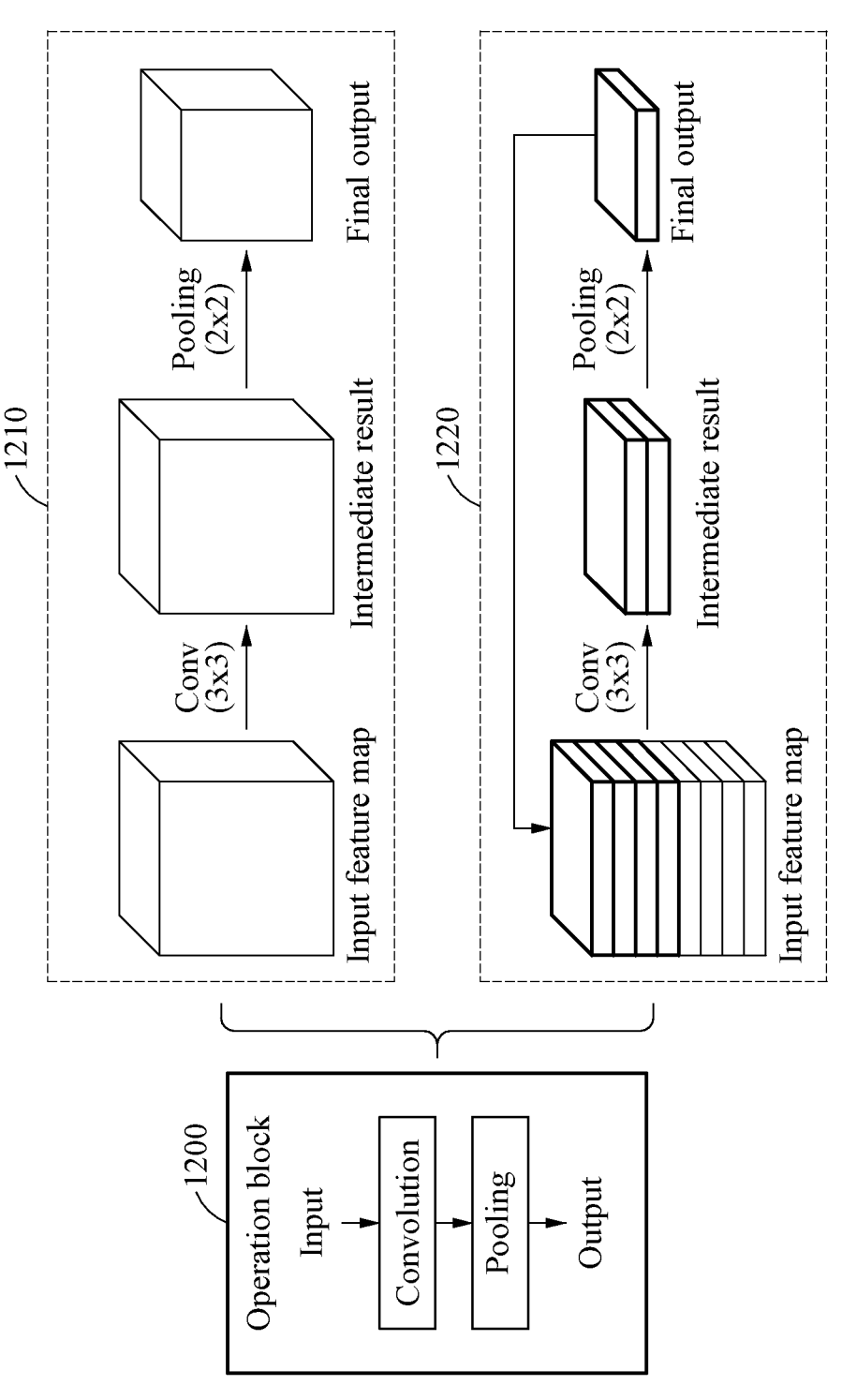
FIG. 12 illustrates an example of an operation process related to an operation block including a pooling operation.

FIG. 12 illustrates an example of an operation process related to an operation block including a pooling operation. Referring to FIG. 12, the operation block 1200 may include a convolution operation and a pooling operation. For example, the size of the convolution operation may be 3×3, and the size of the pooling operation may be 2×2.

According to a general operation process 1210, a convolution operation may be performed with respect to an input feature map, and an intermediate result may be generated. The intermediate result may correspond to an output feature map according to the convolution operation. Then, a pooling operation may be performed with respect to the intermediate result, and a final output may be generated. Thus, according to the general operation process 1210, a memory space for the input feature map, a memory space for the intermediate result, and a memory space for the final output may be used.

According to an operation process 1220, a convolution operation may performed with respect to an input feature map, and an intermediate result may be generated. In an example, a portion of input lines of the input feature map (for example, the portion to be used for generating a final output) may be used to generate the intermediate result. For example, the final output may correspond to a single line, and the intermediate result may correspond to two lines. In an example, four input lines may be selectively used to generate a single output line. The two lines corresponding to the intermediate result may be stored in an additional buffer. Thus, the final output may be generated without using a memory space for storing the intermediate result overall as in the general operation process 1210.

Then, a pooling operation may be performed with respect to the intermediate result, and the final output may be generated. The final output may be stored in a single output line buffer, and then stored in a memory space for the input feature map. Thus, the final output may be generated without using a memory space for storing the final output overall as in the general operation process 1210. Consequently, according to the operation process 1220, the memory space for the input feature map, the additional buffer (for example, a buffer of the size corresponding to two lines) for the intermediate result, and the output line buffer (for example, a buffer of the size corresponding to two lines) for the final output may be used. Thus, the memory space may be efficiently used, thereby improving the functioning of computers on which the operation process 1220 may be implemented.

Figure 13:
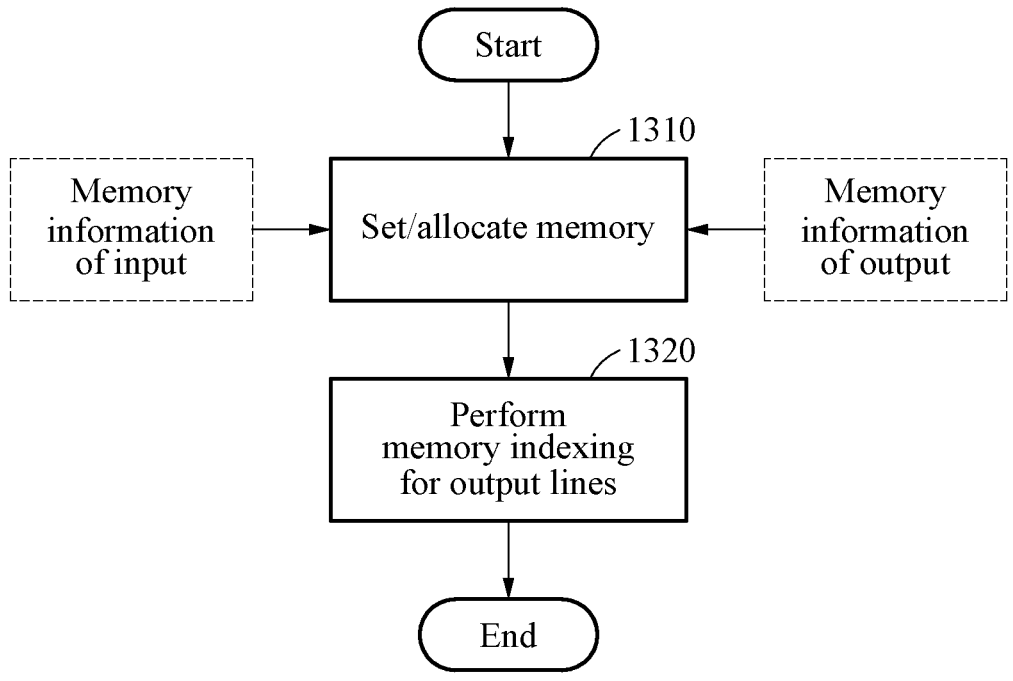
FIG. 13 illustrates an example of setting a memory.

FIG. 13 illustrates an example of setting a memory. Referring to FIG. 13, in operation 1310, a processing apparatus may receive memory information of an input and memory information of an output and perform memory setting and allocation. The input may correspond to an input feature map, and the output may correspond to an output feature map or a final operation result. For example, when an operation block includes a single convolution, the output may correspond to the output feature map. When the operation block includes a plurality of operations, the output may correspond to the final operation result. The memory information may include information (for example, memory addresses) related to memory spaces for the input and the output, the size of the input, and/or the size of the output.

The processing apparatus may perform memory setting and memory allocation based on the memory information of the input and the memory information of the output. For example, the processing apparatus may compare the size of the input and the size of the output and determine the size of an additional memory based on one of Equation 1 and Equation 2. The processing apparatus may determine a memory address of the output feature map based on the size of the additional memory and the memory information of the output feature map. In an example, the memory address of the output may be determined such that at least a portion of the output is overwritten to at least a portion of the input.

In operation 1320, the processing apparatus may perform memory indexing for output lines. The processing apparatus may perform memory indexing for each output line in view of the memory address of the output and the number of output lines. For example, the processing apparatus may divide the memory space of the output according to the memory address of the output by the number of output lines and perform the memory indexing for the output lines based on a result of the dividing. Then, the processing apparatus may store the output lines in the memory space based on a result of the memory indexing. In an example, at least a portion of the output lines may be overwritten to at least a portion of the input.

Figure 14:
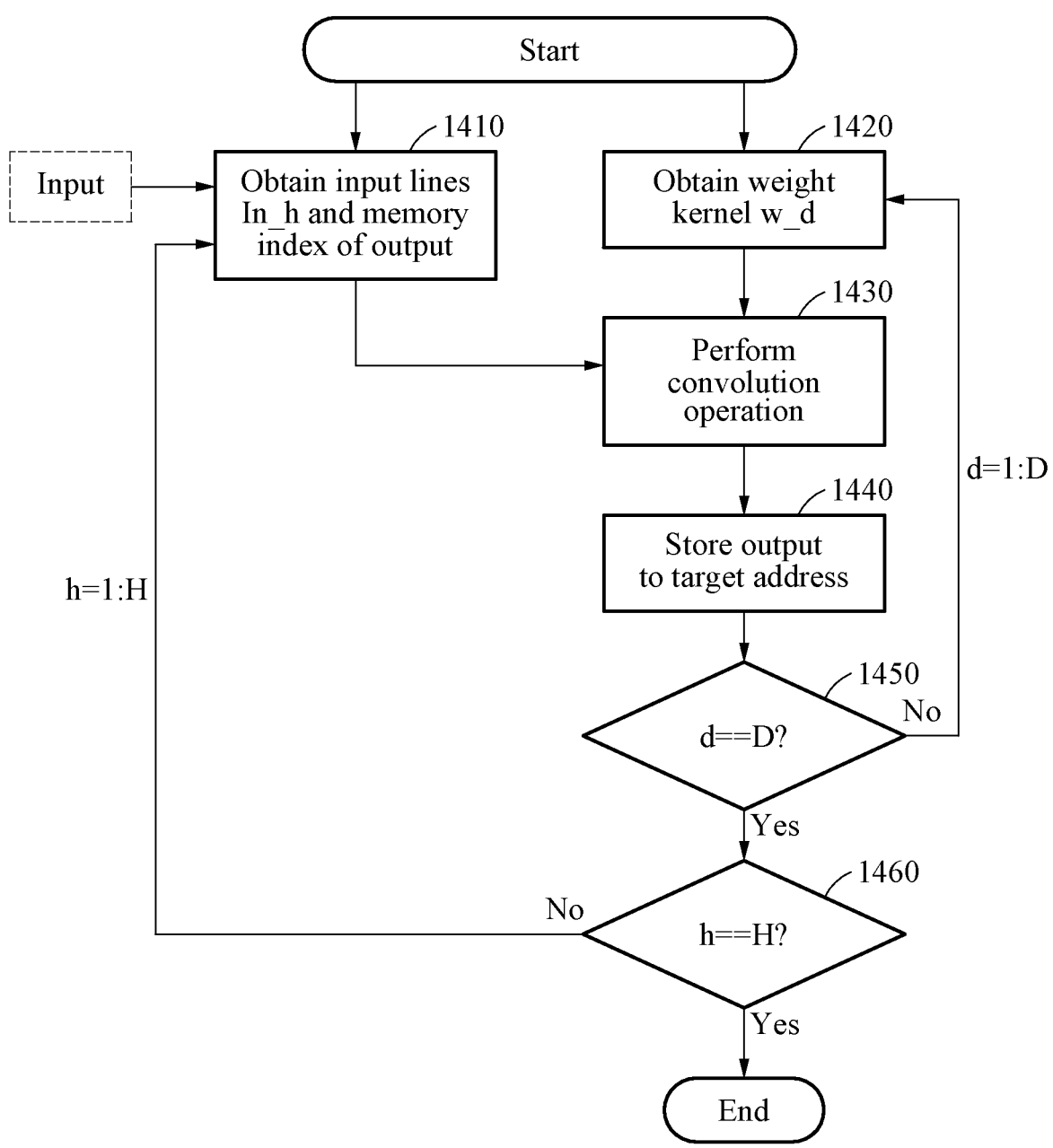
FIG. 14 illustrates an example of a convolution operation process.

FIG. 14 illustrates an example of a convolution operation process. Referring to FIG. 14, in operation 1410, a processing apparatus may receive an input and obtain input lines In_h and a memory index of an output. For example, the processing apparatus may obtain a first input line group including input lines In_1 to In_3. In operation 1420, the processing apparatus may obtain a weight kernel w_d. For example, the processing apparatus may obtain a weight kernel w_1.

In operation 1430, the processing apparatus may perform a convolution operation. For example, when the first input line group and the weight kernel w_1 are obtained in advance, the processing apparatus may perform a convolution operation between the first input line group and the weight kernel w_1. As a result of performing the convolution operation, a first output line Out_1 may be generated. In operation 1440, the processing apparatus may store an output to a target address. Here, the output may be the first output line Out_1 or a final operation result obtained by applying an additional operation to the first output line Out_1. For example, the additional operation may include an additional convolution operation, a skip connection, and/or a pooling operation. The target address may be determined through the memory index of the output.

In operation 1450, the processing apparatus may compare d to D, wherein d denotes an index of a current weight kernel and D denotes the total number of weight kernels. When d is not equal to D, the processing apparatus may increased by "1" and perform operation 1420. When d is equal to D, the processing apparatus may compare h to H in operation 1460, wherein h denotes an index of a current input line and H denotes the total number of input lines. When h is not equal to H, the processing apparatus may increase h by "1" and perform operation 1410. When h is equal to H, the convolution operation may be determined to be complete and/or terminated.

Figure 15:
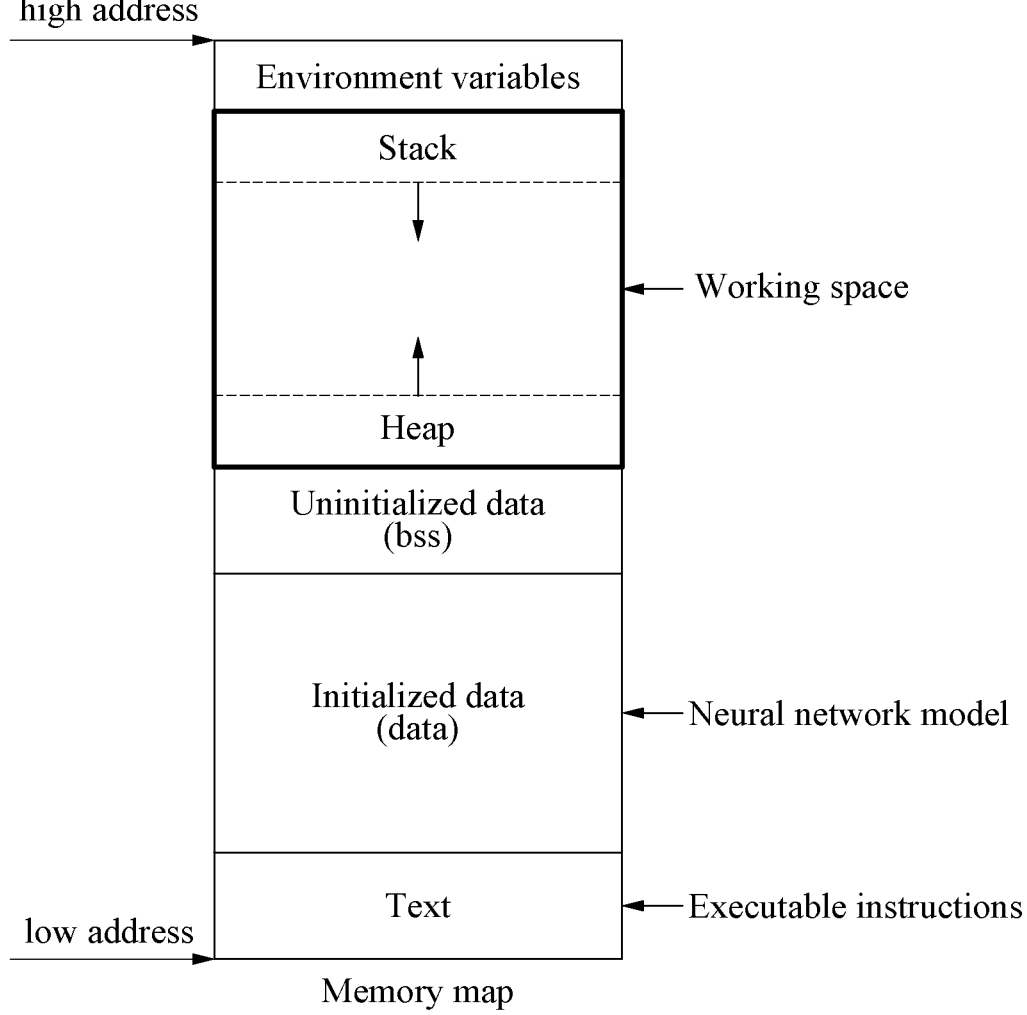
FIG. 15 illustrates an example of a memory map.

FIG. 15 illustrates an example of a memory map. Referring to FIG. 15, a memory map may include a text region, an initialized data region, an uninitialized data region, a stack region, a heap region, and an environment variable region. These regions may be allocated with addresses, from a low address to a high address. The initialized data region may be represented with data, and the uninitialized data region may be represented with a block stated symbol (bss).

In an environment for implementing a neural network, executable instructions may be stored in the text region, and a neural network model may be stored in the data region. Data related to the neural network model may include weight kernels. The stack region, the heap region, and the bss region may correspond to working spaces. An input feature map, an output feature map, and intermediate data used for processing an operation (for example, a convolution operation) related to the neural network may all be processed in the working spaces.

In the case of a hardware-exclusive processor of mobile or an environment where a limited memory is used, such as an Internet of things (IoT) environment embodiment, it may be difficult to perform all the processing related to the neural network in the working spaces. For example, an overflow may occur. According to examples, when an output of an operation is stored in a memory space for the input feature map, the memory space efficiency may increase. Thus, even in an environment where a limited memory is used, the probability of occurrence of an overflow may decrease, thereby improving the functioning of computers with which the memory map may be implemented.

Figure 16:
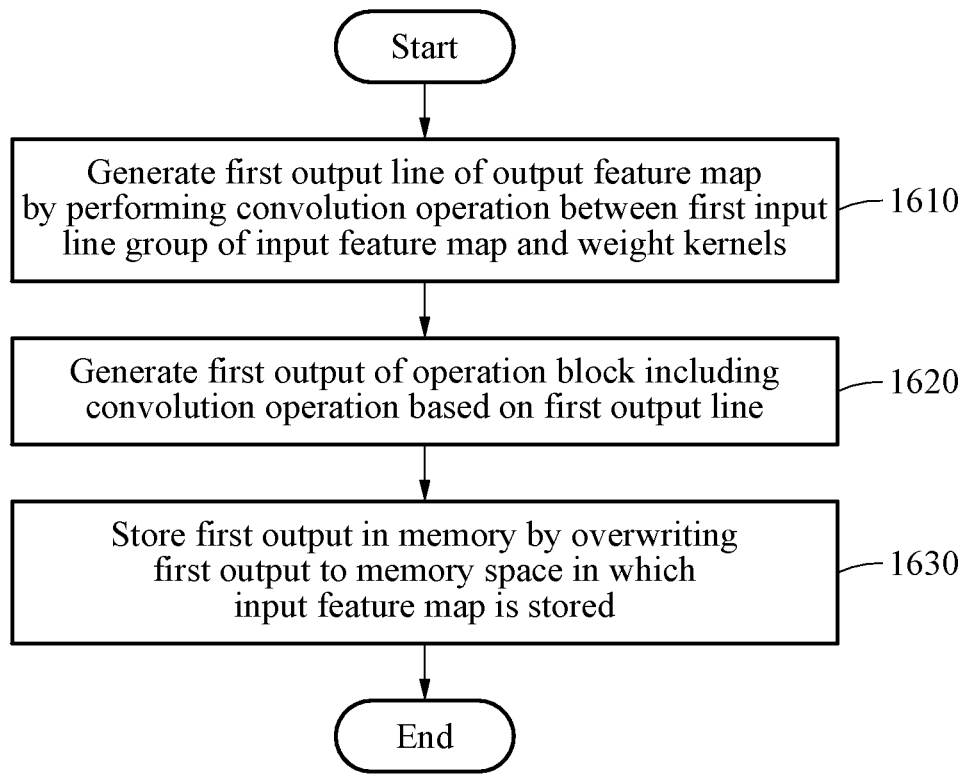
FIG. 16 illustrates an example of a convolution operation processing method.

FIG. 16 illustrates a convolution operation processing method. Referring to FIG. 16, in operation 1610, a processing apparatus may generate a first output line of an output feature map by performing a convolution operation between a first input line group of an input feature map and weight kernels. In operation 1620, the processing apparatus may generate a first output of an operation block including a convolution operation based on the first output line. In operation 1630, the processing apparatus may store the first output in a memory by overwriting the first output to a memory space in which the input feature map is stored. Furthermore, any or all of the examples described above with references to FIGS. 1 through 15 may be apply to the convolution operation processing method.

Figure 17:
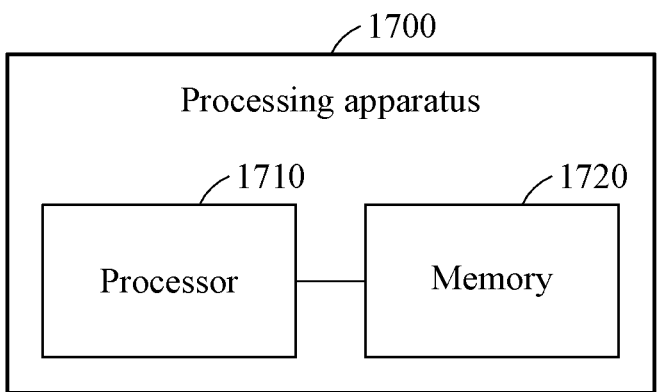
FIG. 17 illustrates an example of a processing apparatus.

FIG. 17 illustrates an example of a processing apparatus. Referring to FIG. 17, a processing apparatus 1700 includes a processor 1710 (for example, one or more processors) and a memory 1720. The memory 1720 may be connected to the processor 1710, and may store instructions executable by the processor 1710, data to be computed by the processor 1710, and/or data processed by the processor 1710. The memory 1720 may include a non-transitory computer-readable medium (for example, a high-speed random access memory) and/or a non-volatile computer-readable medium (for example, at least one disk storage device, flash memory device, or another non-volatile solid-state memory device).

The processor 1710 may execute instructions to perform at least one of the operations described above with reference to FIGS. 1 through 16. For example, the processor 1710 may generate a first output line of an output feature map by performing a convolution operation between a first input line group of an input feature map and weight kernels, generate a first output of an operation block including a convolution operation based on the first output line, and store the first output in a memory by overwriting the first output to a memory space in which the input feature map is stored. Furthermore, any or all of the examples described above with references to FIGS. 1 through 16 may apply to the processing apparatus 1700.

The processing apparatuses, processors, memories, memory spaces, registers, processing apparatus 100, registers r1-r10, memory spaces 710, 720, 810-830, 910-940, 1010, 1020, processing apparatus 1700, processor 1710, memory 1720, and other apparatuses, units, modules, devices, and other components described herein with respect to FIGS. 1-17 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-17 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method comprising:

using one or more processors, generating at least one result of a neural network, which comprises a plurality of layers, based on an input to the neural network and a propagating of the input through one or more of the plurality of layers based on respective performances of neural network operations between the propagated input and respective parameters of the one or more of the plurality of layers, wherein the respective performances of the neural network operations include:

generating a first output line of an output feature map of a layer, of the plurality of layers, by performing a convolution operation of the layer between a first input line group of an input feature map and weight elements of different weight kernels, with the first output line including a plurality of first output line vectors that are respectively dependent on the different weight kernels, to respectively correspond to different output channels of the output feature map;

generating a first output of an operation block, which includes at least the convolution operation of the layer, based on the first output line vectors of the first output line;

storing the first output in a memory in which the input feature map is stored by performing a first overwriting of the first output to a memory space, of the memory, of at least one input line of the input feature map;

generating a second output line of the output feature map of the layer by performing another convolution operation of the layer based on a second input line group of the input feature map and the different weight kernels, with the second output line including a plurality of second output line vectors that are respectively dependent on the different weight kernels, to respectively correspond to the different output channels of the output feature map;

generating a second output of the operation block based on the second output line vectors of the second output line; and storing the second output in the memory in which the input feature map is stored by performing a second overwriting of the second output to another memory space, of the memory, of at least one other input line of the input feature map, wherein the convolution operation is repeatedly performed until an index of a current input line is equal to the total number of input lines of the first input line group, wherein the storing of the second output is performed subsequent to the first overwriting, wherein each of the first input line group and the second input line group comprises a number of input lines corresponding to a height of the weight kernels, and the height of the weight kernels is less than a height of the input feature map, wherein, the input feature map comprising the first input line group and the second input line group and the output feature map comprising the first output line and the second output line is stored in the memory in a line data structure, wherein the line data structure is configured to enable the first and second overwriting by organizing the first and second output lines in a form of a 3D block with the data ordering applied in an order of the width direction, the channel direction, and the height direction, such that each overwriting operation aligns overwritten memory spaces with spanning of each of the first and second output line vectors in a width direction of the 3D block, and wherein the line data structure is further configured to enable simultaneous single-instruction multiple-data (SIMD) processing of multiple channels by overwriting only memory locations containing input lines unused in subsequent convolution operations.

2. The method of claim 1, wherein the at least one input line of the input feature map is not used in any subsequent processing of the operation block, including the generating of the second output of the operation block, in the input feature map.

3. The method of claim 2, wherein the at least one input line is of an input line of the first input line group that is not included in the second input line group of the input feature map.

4. The method of claim 1, wherein the operation block further includes any one or any combination of a pooling operation, a skip connection, and at least a convolution operation of a different layer of the neural network.

5. The method of claim 1, further comprising, prior to the first overwriting:

obtaining information related to at least a portion of the memory space of the at least one input line in which feature elements of the input feature map are stored; and allocating the memory space of the at least one input line for the output feature map, such that at least a portion of the output feature map is overwritten to the at least portion of the memory space by the first overwriting.

6. The method of claim 1, wherein the generating of the first output line comprises:

generating a first output element vector of the first output line by performing the convolution operation between the input lines of the first input line group and a first weight kernel corresponding to a first output channel; and generating a second output element vector of the first output line by performing the convolution operation between the input lines of the first input line group and a second weight kernel corresponding to a second output channel, wherein the first output element vector of the first output line corresponds to the first output channel, and wherein the second output element vector of the first output line corresponds to the first output channel.

7. The method of claim 1, wherein the generating of the first output line comprises accumulating weighted input element vectors generated based on products between input element vectors of the first input line group and the weight elements of the different weight kernels.

8. The method of claim 7, wherein the generating of the first output line comprises multiplying a first input element vector corresponding to a first offset, among the input element vectors, with a first weight element corresponding to the first offset, among the weight elements.

9. The method of claim 7, wherein the generating of the first output line comprises, in response to the first weight element being a zero-weight element corresponding to "0", omitting the multiplying of the first input element vector with the first weight element.

10. The method of claim 1, wherein, with the operation block comprising a first operation corresponding to the convolution operation and a second operation that is different from the first operation and uses the first output line, the generating of the first output comprises:

allocating an additional buffer for the first output line, the additional buffer corresponding to the size of the first output line;

performing the first operation and storing a result of the first operation as the first output line in the additional buffer;

allocating an output line buffer for the first output, the output line buffer corresponding to the size of the first output; and performing the second operation using the first output line and storing a result of the second operation as the first output in the output line buffer.

11. The method of claim 10, wherein the storing of the first output in the memory comprises storing the first output of the output line buffer in the memory.

12. A processor-implemented neural network method comprising:

using one or more processors, generating at least one result of a neural network, which comprises a plurality of layers, based on an input to the neural network and a propagating of the input through one or more of the plurality of layers based on respective performances of neural network operations between the propagated input and respective parameters of the one or more of the plurality of layers, wherein the respective performances of the neural network operations include:

generating a first output line of an output feature map of a layer, of the plurality of layers, by performing a convolution operation of the layer between a first input line group, comprising a plurality of first input lines that each include first vectors, of an input feature map and weight element of different weight kernels; and generating a first output of an operation block, which includes at least the convolution operation of the layer, based on the first output line;

storing the first output in a memory in which the input feature map is stored by performing a first overwriting of the first output to a memory space, of the memory, of at least one input line of the input feature map;

generating a second output line of the output feature map of the layer by performing another convolution operation of the layer based on a second input line group, comprising a plurality of second input lines that each include second vectors, of the input feature map and the different weight kernels;

generating a second output of the operation block based on the second output line; and storing the second output in the memory in which the input feature map is stored by performing a second overwriting of the second output to another memory space, of the memory, of at least one other input line of the input feature map, wherein, the input feature map comprising the first input line group and the second input line group and the output feature map comprising the first output line and the second output line is stored in the memory in a line data structure, wherein the convolution operation is repeatedly performed until an index of a current input line is equal to the total number of the plurality of first input lines, wherein the storing of the second output is performed subsequent to the first overwriting, wherein each of the first input line group and the second input line group comprises a number of input lines corresponding to a height of the weight kernels, and the height of the weight kernels is less than a height of the input feature map, wherein the line data structure is configured to enable the first and second overwriting by organizing the first and second output lines in a form of a 3D block with the data ordering applied in an order of the width direction, the channel direction, and the height direction, such that each overwriting operation aligns overwritten memory spaces with spanning of each of the first and second output line vectors in a width direction of the 3D block, and wherein the line data structure is further configured to enable simultaneous single-instruction multiple-data (SIMD) processing of multiple channels by overwriting only memory locations containing input lines unused in subsequent convolution operations.

13. The method of claim 12, wherein the line data structure is different from a planar data structure to which data ordering is applied in an order of the width direction, the height direction, and the channel direction, and different from an interleaved data structure to which data ordering is applied in an order of the channel direction, the width direction, and the height direction.

14. The method of claim 1, wherein the input feature map comprises a plurality of input lines, each including input feature vectors, in each of a plurality of input line groups that include the first input line group and the second input line group.

15. The method of claim 1, wherein the total number of the input lines included in the first input line group corresponds to a total number of rows of a weight kernel of the different weight kernels.

16. A non-transitory computer-readable storage medium storing instructions that, when executed by the one or more processors, configure the one or more processors to perform the method of claim 1.

17. A neural network apparatus comprising:

one or more processors configured to generate at least one result of a neural network, which comprises a plurality of layers, based on an input to the neural network and a propagating of the input through one or more of the plurality of layers based on respective performances of neural network operations between the propagated input and respective parameters of the one or more of the plurality of layers, wherein the respective performances of the neural network operations include:

a generation of a first output line of an output feature map of a layer, of the plurality of layers, by performing a convolution operation of the layer between a first input line group of an input feature map and weight elements of different weight kernels, with the first output line including a plurality of first output line vectors that are respectively dependent on the different weight kernels, to respectively correspond to different output channels of the output feature map;

a generation of a first output of an operation block, which includes at least the convolution operation of the layer, based on the first output line vectors of the first output line, and a storage of the first output in a memory in which the input feature map is stored by performing a first overwriting of the first output to a memory space, of the memory, of at least one input line of the input feature map;

a generation of a second output line of the output feature map of the layer by performing another convolution operation of the layer based on a second input line group of the input feature map and the different weight kernels, with the second output line including a plurality of second output line vectors that are respectively dependent on the different weight kernels, to respectively correspond to the different output channels of the output feature map;

a generation of a second output of the operation block based on the second output line vectors of the second output line; and a storage of the second output in the memory in which the input feature map is stored by performing a second overwriting of the second output to another memory space, of the memory, of at least one other input line of the input feature map, wherein the convolution operation is repeatedly performed until an index of a current input line is equal to the total number of input lines of the first input line group, wherein the storing of the second output is performed subsequent to the first overwriting, wherein each of the first input line group and the second input line group comprises a number of input lines corresponding to a height of the weight kernels, and the height of the weight kernels is less than a height of the input feature map, wherein, the input feature map comprising the first input line group and the second input line group and the output feature map comprising the first output line and the second output line is stored in the memory in a line data structure, wherein the line data structure is configured to enable the first and second overwriting by organizing the first and second output lines in a form of a 3D block with the data ordering applied in an order of the width direction, the channel direction, and the height direction, such that each overwriting operation aligns overwritten memory spaces with spanning of each of the first and second output line vectors in a width direction of the 3D block, and wherein the line data structure is further configured to enable simultaneous single-instruction multiple-data (SIMD) processing of multiple channels by overwriting only memory locations containing input lines unused in subsequent convolution operations.

18. The apparatus of claim 17, wherein the at least one input line of the input feature map is not used in any subsequent processing of the operation block, including the generating of the second output of the operation block, in the input feature map.

19. The apparatus of claim 17, wherein the one or more processors are configured to, prior to the first overwriting, obtain information related to at least a portion of the memory space of the at least one input line in which feature elements of the input feature map are stored, and allocate the memory space of the at least one input line for the output feature map, such that at least a portion of the output feature map is overwritten to the at least portion of the memory space by the first overwriting.

20. The apparatus of claim 17, wherein, for the generating of the first output line, the one or more processors are configured to accumulate multiplication results determined based on input element vectors of the first input line group and the weight elements of the different weight kernels.

21. The apparatus of claim 17, wherein for the generating of the first output line, the one or more processors are configured to:

generate a first output element vector of the first output line by accumulating multiplication results determined based on the input element vectors of the first input line group and the weight elements, the weight elements being of a first weight kernel of the weight kernels corresponding to a first output channel; and generate a second output element vector of the first output line by performing the convolution operation between the input lines of the first input line group and a second weight kernel corresponding to a second output channel, wherein the first output element vector of the first output line corresponds to the first output channel, and wherein the second output element vector of the first output line corresponds to the first output channel.

22. The apparatus of claim 17, wherein, with the operation block comprising a first operation corresponding to the convolution operation and a second operation that is different from the first operation and uses the first output line, for the generating of the first output, the one or more processors are configured to allocate an additional buffer for the first output line, the additional buffer corresponding to the size of the first output line, perform the first operation and store a result of the first operation as the first output line in the additional buffer, allocate an output line buffer for the first output, the output line buffer corresponding to the size of the first output, and perform the second operation using the first output line and store a result of the second operation as the first output in the output line buffer.

23. The apparatus of claim 22, wherein, for the storing of the first output in the memory, the one or more processors are configured to store the first output of the output line buffer in the memory.

24. The apparatus of claim 17, wherein, prior to the first overwriting, the input feature map is stored in the memory in a line data structure to which data ordering is applied in an order of a width direction, a channel direction, and a height direction.

25. The apparatus of claim 17, wherein the input feature map comprises a plurality of input lines each including input feature vectors.

26. The apparatus of claim 17, wherein the at least one input line is of a first input line, of the first input line group, that has plural feature elements addressed within a first channel of the input feature map.

27. The method of claim 12, wherein the plurality of second input lines does not include an input line of the plurality of first input lines, and include other input lines of the plurality of first input lines.

28. The method of claim 12, wherein the plurality of vectors of an input line of the first input line group comprises multiple vectors corresponding to different channels of the input feature map.

29. The method of claim 1, further comprising training the neural network based on results of the convolution operation for an inference operation.

* * * * *